United States Patent
Pallas et al.

(10) Patent No.: US 10,680,887 B2
(45) Date of Patent: Jun. 9, 2020

(54) REMOTE DEVICE STATUS AUDIT AND RECOVERY

(71) Applicant: Cisco Technology, Inc., San Jose, CA (US)

(72) Inventors: Derrick Pallas, San Francisco, CA (US); Mark Hendrick, San Francisco, CA (US); Nilesh Hirve, Daly City, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 106 days.

(21) Appl. No.: 15/656,551

(22) Filed: Jul. 21, 2017

(65) Prior Publication Data
US 2019/0028346 A1   Jan. 24, 2019

(51) Int. Cl.
| H04L 12/24 | (2006.01) |
| H04W 24/04 | (2009.01) |
| H04L 29/06 | (2006.01) |
| H04W 84/12 | (2009.01) |

(52) U.S. Cl.
CPC ...... *H04L 41/0816* (2013.01); *H04L 41/0672* (2013.01); *H04L 41/0853* (2013.01); *H04L 41/0866* (2013.01); *H04L 41/0869* (2013.01); *H04L 63/1408* (2013.01); *H04W 24/04* (2013.01); *H04W 84/12* (2013.01)

(58) Field of Classification Search
CPC .................. H04L 41/0869; H04L 63/1408
See application file for complete search history.

(56) References Cited

U.S. PATENT DOCUMENTS

| 5,086,385 A | 2/1992 | Launey et al. |
| 5,319,754 A | 6/1994 | Meinecke et al. |
| 5,400,246 A | 3/1995 | Wilson et al. |
| 5,436,909 A | 7/1995 | Dev et al. |

(Continued)

FOREIGN PATENT DOCUMENTS

| CN | 101093452 | 12/2007 |
| CN | 101770551 | 7/2010 |

(Continued)

OTHER PUBLICATIONS

Arista Networks, Inc., "Application Visibility and Network Telemtry using Splunk," Arista White Paper, Nov. 2013, 11 pages.

(Continued)

*Primary Examiner* — Lashonda T Jacobs
(74) *Attorney, Agent, or Firm* — Polsinelli PC

(57) ABSTRACT

Systems, methods, and computer-readable media are disclosed for remotely managing and correcting implementation of configuration settings at network devices operating in the network. In one aspect of the present disclosure, a method includes transmitting, by a controller, a request to a network device of the network for a status of operation of the network device with respect at least one configuration setting available at the network device; determining, by the controller, whether the status matches an operation status provided by the at least one configuration setting; and performing, by the controller, a recovery process to adjust the implementation of the at least one configuration setting when the determining determines that the status does not match the operation status.

20 Claims, 5 Drawing Sheets

(56) References Cited

U.S. PATENT DOCUMENTS

| | | |
|---|---|---|
| 5,555,416 A | 9/1996 | Owens et al. |
| 5,726,644 A | 3/1998 | Jednacz et al. |
| 5,742,829 A | 4/1998 | Davis et al. |
| 5,822,731 A | 10/1998 | Schultz |
| 5,831,848 A | 11/1998 | Rielly et al. |
| 5,903,545 A | 5/1999 | Sabourin et al. |
| 6,012,096 A | 1/2000 | Link et al. |
| 6,141,595 A | 10/2000 | Gloudeman et al. |
| 6,144,962 A | 11/2000 | Weinberg et al. |
| 6,239,699 B1 | 5/2001 | Ronnen |
| 6,247,058 B1 | 6/2001 | Miller et al. |
| 6,249,241 B1 | 6/2001 | Jordan et al. |
| 6,330,562 B1 | 12/2001 | Boden et al. |
| 6,353,775 B1 | 3/2002 | Nichols |
| 6,525,658 B2 | 2/2003 | Streetman et al. |
| 6,546,420 B1 | 4/2003 | Lemler et al. |
| 6,597,663 B1 | 7/2003 | Rekhter |
| 6,611,896 B1 | 8/2003 | Mason, Jr. et al. |
| 6,654,750 B1 | 11/2003 | Adams et al. |
| 6,728,779 B1 | 4/2004 | Griffin et al. |
| 6,801,878 B1 | 10/2004 | Hintz et al. |
| 6,816,461 B1 | 11/2004 | Scrandis et al. |
| 6,847,993 B1 | 1/2005 | Novaes et al. |
| 6,848,106 B1 | 1/2005 | Hipp |
| 6,925,490 B1 | 8/2005 | Novaes et al. |
| 6,958,998 B2 | 10/2005 | Shorey |
| 6,983,323 B2 | 1/2006 | Cantrell et al. |
| 6,996,817 B2 | 2/2006 | Birum et al. |
| 6,999,452 B1 | 2/2006 | Drummond-Murray et al. |
| 7,002,464 B2 | 2/2006 | Bruemmer et al. |
| 7,024,468 B1 | 4/2006 | Meyer et al. |
| 7,096,368 B2 | 8/2006 | Kouznetsov et al. |
| 7,111,055 B2 | 9/2006 | Falkner |
| 7,120,934 B2 | 10/2006 | Ishikawa |
| 7,133,923 B2 | 11/2006 | MeLampy et al. |
| 7,162,643 B1 | 1/2007 | Sankaran et al. |
| 7,181,769 B1 | 2/2007 | Keanini et al. |
| 7,185,103 B1 | 2/2007 | Jain |
| 7,203,740 B1 | 4/2007 | Putzolu et al. |
| 7,302,487 B2 | 11/2007 | Ylonen et al. |
| 7,337,206 B1 | 2/2008 | Wen et al. |
| 7,349,761 B1 | 3/2008 | Cruse |
| 7,353,511 B1 | 4/2008 | Ziese |
| 7,356,679 B1 | 4/2008 | Le et al. |
| 7,360,072 B1 | 4/2008 | Soltis et al. |
| 7,370,092 B2 | 5/2008 | Aderton et al. |
| 7,395,195 B2 | 7/2008 | Suenbuel et al. |
| 7,444,404 B2 | 10/2008 | Wetherall et al. |
| 7,466,681 B2 | 12/2008 | Ashwood-Smith et al. |
| 7,467,205 B1 | 12/2008 | Dempster et al. |
| 7,496,040 B2 | 2/2009 | Seo |
| 7,496,575 B2 | 2/2009 | Buccella et al. |
| 7,530,105 B2 | 5/2009 | Gilbert et al. |
| 7,539,770 B2 | 5/2009 | Meier |
| 7,568,107 B1 | 7/2009 | Rathi et al. |
| 7,610,330 B1 | 10/2009 | Quinn et al. |
| 7,633,942 B2 | 12/2009 | Bearden et al. |
| 7,644,438 B1 | 1/2010 | Dash et al. |
| 7,676,570 B2 | 3/2010 | Levy et al. |
| 7,681,131 B1 | 3/2010 | Quarterman et al. |
| 7,693,947 B2 | 4/2010 | Judge et al. |
| 7,743,242 B2 | 6/2010 | Oberhaus et al. |
| 7,752,307 B2 | 7/2010 | Takara |
| 7,774,498 B1 | 8/2010 | Kraemer et al. |
| 7,783,457 B2 | 8/2010 | Cunningham |
| 7,787,480 B1 | 8/2010 | Mehta et al. |
| 7,788,477 B1 | 8/2010 | Huang et al. |
| 7,808,897 B1 | 10/2010 | Mehta et al. |
| 7,813,822 B1 | 10/2010 | Hoffberg |
| 7,844,696 B2 | 11/2010 | Labovitz et al. |
| 7,844,744 B2 | 11/2010 | Abercrombie et al. |
| 7,864,707 B2 | 1/2011 | Dimitropoulos et al. |
| 7,873,025 B2 | 1/2011 | Patel et al. |
| 7,873,074 B1 | 1/2011 | Boland |
| 7,874,001 B2 | 1/2011 | Beck et al. |
| 7,885,197 B2 | 2/2011 | Metzler |
| 7,895,649 B1 | 2/2011 | Brook et al. |
| 7,904,420 B2 | 3/2011 | Ianni |
| 7,930,752 B2 | 4/2011 | Hertzog et al. |
| 7,934,248 B1 | 4/2011 | Yehuda et al. |
| 7,957,934 B2 | 6/2011 | Greifeneder |
| 7,961,637 B2 | 6/2011 | McBeath |
| 7,970,946 B1 | 6/2011 | Djabarov et al. |
| 7,975,035 B2 | 7/2011 | Popescu et al. |
| 8,001,610 B1 | 8/2011 | Chickering et al. |
| 8,005,935 B2 | 8/2011 | Pradhan et al. |
| 8,040,232 B2 | 10/2011 | Oh et al. |
| 8,040,822 B2 | 10/2011 | Proulx et al. |
| 8,056,134 B1 | 11/2011 | Ogilvie |
| 8,115,617 B2 | 2/2012 | Thubert et al. |
| 8,135,657 B2 | 3/2012 | Kapoor et al. |
| 8,156,430 B2 | 4/2012 | Newman |
| 8,160,063 B2 | 4/2012 | Maltz et al. |
| 8,179,809 B1 | 5/2012 | Eppstein et al. |
| 8,181,248 B2 | 5/2012 | Oh et al. |
| 8,185,824 B1 | 5/2012 | Mitchell et al. |
| 8,239,365 B2 | 8/2012 | Salman |
| 8,239,915 B1 | 8/2012 | Satish et al. |
| 8,250,657 B1 | 8/2012 | Nachenberg et al. |
| 8,255,972 B2 | 8/2012 | Azagury et al. |
| 8,266,697 B2 | 9/2012 | Coffman |
| 8,272,875 B1 | 9/2012 | Jurmain |
| 8,281,397 B2 | 10/2012 | Vaidyanathan et al. |
| 8,291,495 B1 | 10/2012 | Burns et al. |
| 8,296,847 B2 | 10/2012 | Mendonca et al. |
| 8,311,973 B1 | 11/2012 | Zadeh |
| 8,365,286 B2 | 1/2013 | Poston |
| 8,370,407 B1 | 2/2013 | Devarajan et al. |
| 8,381,289 B1 | 2/2013 | Pereira et al. |
| 8,391,270 B2 | 3/2013 | Van Der Stok et al. |
| 8,407,164 B2 | 3/2013 | Malik et al. |
| 8,407,798 B1 | 3/2013 | Lotem et al. |
| 8,413,235 B1 | 4/2013 | Chen et al. |
| 8,442,073 B2 | 5/2013 | Skubacz et al. |
| 8,451,731 B1 | 5/2013 | Lee et al. |
| 8,462,212 B1 | 6/2013 | Kundu et al. |
| 8,489,765 B2 | 7/2013 | Vasseur et al. |
| 8,499,348 B1 | 7/2013 | Rubin |
| 8,516,590 B1 | 8/2013 | Ranadive et al. |
| 8,527,977 B1 | 9/2013 | Cheng et al. |
| 8,549,635 B2 | 10/2013 | Muttik et al. |
| 8,570,861 B1 | 10/2013 | Brandwine et al. |
| 8,572,600 B2 | 10/2013 | Chung et al. |
| 8,572,734 B2 | 10/2013 | McConnell et al. |
| 8,572,735 B2 | 10/2013 | Ghosh et al. |
| 8,572,739 B1 | 10/2013 | Cruz et al. |
| 8,588,081 B2 | 11/2013 | Salam et al. |
| 8,600,726 B1 | 12/2013 | Varshney et al. |
| 8,613,084 B2 | 12/2013 | Dalcher |
| 8,615,803 B2 | 12/2013 | Dacier et al. |
| 8,630,316 B2 | 1/2014 | Haba |
| 8,631,464 B2 | 1/2014 | Belakhdar et al. |
| 8,640,086 B2 | 1/2014 | Bonev et al. |
| 8,656,493 B2 | 2/2014 | Capalik |
| 8,661,544 B2 | 2/2014 | Yen et al. |
| 8,677,487 B2 | 3/2014 | Balupari et al. |
| 8,683,389 B1 | 3/2014 | Bar-Yam et al. |
| 8,706,914 B2 | 4/2014 | Duchesneau |
| 8,713,676 B2 | 4/2014 | Pandrangi et al. |
| 8,719,452 B1 | 5/2014 | Ding et al. |
| 8,719,835 B2 | 5/2014 | Kanso et al. |
| 8,750,287 B2 | 6/2014 | Bui et al. |
| 8,752,042 B2 | 6/2014 | Ratica |
| 8,752,179 B2 | 6/2014 | Zaitsev |
| 8,755,396 B2 | 6/2014 | Sindhu et al. |
| 8,762,951 B1 | 6/2014 | Kosche et al. |
| 8,769,084 B2 | 7/2014 | Westerfeld et al. |
| 8,775,577 B1 | 7/2014 | Alford et al. |
| 8,776,180 B2 | 7/2014 | Kumar et al. |
| 8,812,448 B1 | 8/2014 | Anderson et al. |
| 8,812,725 B2 | 8/2014 | Kulkarni |
| 8,813,236 B1 | 8/2014 | Saha et al. |
| 8,825,848 B1 | 9/2014 | Dotan et al. |
| 8,832,013 B1 | 9/2014 | Adams et al. |

(56) References Cited

U.S. PATENT DOCUMENTS

| | | |
|---|---|---|
| 8,832,461 B2 | 9/2014 | Saroiu et al. |
| 8,849,926 B2 | 9/2014 | Marzencki et al. |
| 8,881,258 B2 | 11/2014 | Paul et al. |
| 8,887,238 B2 | 11/2014 | Howard et al. |
| 8,904,520 B1 | 12/2014 | Nachenberg et al. |
| 8,908,685 B2 | 12/2014 | Patel et al. |
| 8,914,497 B1 | 12/2014 | Xiao et al. |
| 8,931,043 B2 | 1/2015 | Cooper et al. |
| 8,954,610 B2 | 2/2015 | Berke et al. |
| 8,955,124 B2 | 2/2015 | Kim et al. |
| 8,966,021 B1 | 2/2015 | Allen |
| 8,966,625 B1 | 2/2015 | Zuk et al. |
| 8,973,147 B2 | 3/2015 | Pearcy et al. |
| 8,984,331 B2 | 3/2015 | Quinn |
| 8,990,386 B2 | 3/2015 | He et al. |
| 8,996,695 B2 | 3/2015 | Anderson et al. |
| 8,997,227 B1 | 3/2015 | Mhatre et al. |
| 9,014,047 B2 | 4/2015 | Alcala et al. |
| 9,015,716 B2 | 4/2015 | Fletcher et al. |
| 9,071,575 B2 | 6/2015 | Lemaster et al. |
| 9,088,598 B1 | 7/2015 | Zhang et al. |
| 9,110,905 B2 | 8/2015 | Polley et al. |
| 9,117,075 B1 | 8/2015 | Yeh |
| 9,130,836 B2 | 9/2015 | Kapadia et al. |
| 9,152,789 B2 | 10/2015 | Natarajan et al. |
| 9,160,764 B2 | 10/2015 | Stiansen et al. |
| 9,170,917 B2 | 10/2015 | Kumar et al. |
| 9,178,906 B1 | 11/2015 | Chen et al. |
| 9,185,127 B2 | 11/2015 | Neou et al. |
| 9,191,400 B1 | 11/2015 | Ptasinski et al. |
| 9,191,402 B2 | 11/2015 | Yan |
| 9,197,654 B2 | 11/2015 | Ben-Shalom et al. |
| 9,225,793 B2 | 12/2015 | Dutta et al. |
| 9,237,111 B2 | 1/2016 | Banavalikar et al. |
| 9,246,702 B1 | 1/2016 | Sharma et al. |
| 9,246,773 B2 | 1/2016 | Degioanni |
| 9,253,042 B2 | 2/2016 | Lumezanu et al. |
| 9,253,206 B1 | 2/2016 | Fleischman |
| 9,258,217 B2 | 2/2016 | Duffield et al. |
| 9,281,940 B2 | 3/2016 | Matsuda et al. |
| 9,286,047 B1 | 3/2016 | Avramov et al. |
| 9,294,486 B1 | 3/2016 | Chiang et al. |
| 9,317,574 B1 | 4/2016 | Brisebois et al. |
| 9,319,384 B2 | 4/2016 | Yan et al. |
| 9,369,435 B2 | 6/2016 | Short et al. |
| 9,369,479 B2 | 6/2016 | Lin |
| 9,378,068 B2 | 6/2016 | Anantharam et al. |
| 9,396,327 B2 | 7/2016 | Auger et al. |
| 9,405,903 B1 | 8/2016 | Xie et al. |
| 9,417,985 B2 | 8/2016 | Baars et al. |
| 9,418,222 B1 | 8/2016 | Rivera et al. |
| 9,426,068 B2 | 8/2016 | Dunbar et al. |
| 9,454,324 B1 | 9/2016 | Madhavapeddi |
| 9,462,013 B1 | 10/2016 | Boss et al. |
| 9,465,696 B2 | 10/2016 | McNeil et al. |
| 9,501,744 B1 | 11/2016 | Brisebois et al. |
| 9,531,589 B2 | 12/2016 | Clemm et al. |
| 9,563,517 B1 | 2/2017 | Natanzon et al. |
| 9,621,413 B1 | 4/2017 | Lee |
| 9,634,915 B2 | 4/2017 | Bley |
| 9,645,892 B1 | 5/2017 | Patwardhan |
| 9,684,453 B2 | 6/2017 | Holt et al. |
| 9,697,033 B2 | 7/2017 | Koponen et al. |
| 9,733,973 B2 | 8/2017 | Prasad et al. |
| 9,749,145 B2 | 8/2017 | Banavalikar et al. |
| 9,792,188 B2 * | 10/2017 | Shen .................. G06F 11/0793 |
| 9,800,608 B2 | 10/2017 | Korsunsky et al. |
| 9,904,584 B2 | 2/2018 | Konig et al. |
| 9,916,538 B2 | 3/2018 | Zadeh et al. |
| 9,935,851 B2 | 4/2018 | Gandham et al. |
| 10,009,240 B2 | 6/2018 | Rao et al. |
| 2001/0028646 A1 | 10/2001 | Arts et al. |
| 2002/0053033 A1 | 5/2002 | Cooper et al. |
| 2002/0097687 A1 | 7/2002 | Meiri et al. |
| 2002/0103793 A1 | 8/2002 | Koller et al. |
| 2002/0107857 A1 | 8/2002 | Teraslinna |
| 2002/0141343 A1 | 10/2002 | Bays |
| 2002/0184393 A1 | 12/2002 | Leddy et al. |
| 2003/0023601 A1 | 1/2003 | Fortier, Jr. et al. |
| 2003/0065986 A1 | 4/2003 | Fraenkel et al. |
| 2003/0097439 A1 | 5/2003 | Strayer et al. |
| 2003/0126242 A1 | 7/2003 | Chang |
| 2003/0145232 A1 | 7/2003 | Poletto et al. |
| 2003/0151513 A1 | 8/2003 | Herrmann et al. |
| 2003/0154399 A1 | 8/2003 | Zuk et al. |
| 2003/0177208 A1 | 9/2003 | Harvey, IV |
| 2004/0019676 A1 | 1/2004 | Iwatsuki et al. |
| 2004/0030776 A1 | 2/2004 | Cantrell et al. |
| 2004/0213221 A1 | 10/2004 | Civanlar et al. |
| 2004/0220984 A1 | 11/2004 | Dudfield et al. |
| 2004/0243533 A1 | 12/2004 | Dempster et al. |
| 2004/0255050 A1 | 12/2004 | Takehiro et al. |
| 2004/0268149 A1 | 12/2004 | Aaron |
| 2005/0028154 A1 | 2/2005 | Smith et al. |
| 2005/0039104 A1 | 2/2005 | Shah et al. |
| 2005/0063377 A1 | 3/2005 | Bryant et al. |
| 2005/0083933 A1 | 4/2005 | Fine et al. |
| 2005/0108331 A1 | 5/2005 | Osterman |
| 2005/0122325 A1 | 6/2005 | Twait |
| 2005/0138157 A1 | 6/2005 | Jung et al. |
| 2005/0166066 A1 | 7/2005 | Ahuja et al. |
| 2005/0177829 A1 | 8/2005 | Vishwanath |
| 2005/0182681 A1 | 8/2005 | Bruskotter et al. |
| 2005/0185621 A1 | 8/2005 | Sivakumar et al. |
| 2005/0198247 A1 | 9/2005 | Perry et al. |
| 2005/0198371 A1 | 9/2005 | Smith et al. |
| 2005/0198629 A1 | 9/2005 | Vishwanath |
| 2005/0207376 A1 | 9/2005 | Ashwood-Smith et al. |
| 2005/0228874 A1 * | 10/2005 | Edgett .................. H04L 63/08 709/220 |
| 2005/0257244 A1 | 11/2005 | Joly et al. |
| 2005/0289244 A1 | 12/2005 | Sahu et al. |
| 2006/0048218 A1 | 3/2006 | Lingafelt et al. |
| 2006/0077909 A1 | 4/2006 | Saleh et al. |
| 2006/0080733 A1 | 4/2006 | Khosmood et al. |
| 2006/0089985 A1 | 4/2006 | Poletto |
| 2006/0095968 A1 | 5/2006 | Portolani et al. |
| 2006/0143432 A1 | 6/2006 | Rothman et al. |
| 2006/0156408 A1 | 7/2006 | Himberger et al. |
| 2006/0159032 A1 | 7/2006 | Ukrainetz et al. |
| 2006/0173912 A1 | 8/2006 | Lindvall et al. |
| 2006/0195448 A1 | 8/2006 | Newport |
| 2006/0272018 A1 | 11/2006 | Fouant |
| 2006/0274659 A1 | 12/2006 | Ouderkirk |
| 2006/0280179 A1 | 12/2006 | Meier |
| 2006/0294219 A1 | 12/2006 | Ogawa et al. |
| 2007/0014275 A1 | 1/2007 | Bettink et al. |
| 2007/0025306 A1 | 2/2007 | Cox et al. |
| 2007/0038743 A1 * | 2/2007 | Hellhake .......... H04L 29/12283 709/224 |
| 2007/0044147 A1 | 2/2007 | Choi et al. |
| 2007/0097976 A1 | 5/2007 | Wood et al. |
| 2007/0118654 A1 | 5/2007 | Jamkhedkar et al. |
| 2007/0127491 A1 | 6/2007 | Verzijp et al. |
| 2007/0162420 A1 | 7/2007 | Ou et al. |
| 2007/0169179 A1 | 7/2007 | Narad |
| 2007/0195729 A1 | 8/2007 | Li et al. |
| 2007/0195794 A1 | 8/2007 | Fujita et al. |
| 2007/0195797 A1 | 8/2007 | Patel et al. |
| 2007/0201474 A1 | 8/2007 | Isobe |
| 2007/0211637 A1 | 9/2007 | Mitchell |
| 2007/0214348 A1 | 9/2007 | Danielsen |
| 2007/0220303 A1 * | 9/2007 | Kimura ............... G06F 11/0709 714/4.11 |
| 2007/0230415 A1 | 10/2007 | Malik |
| 2007/0232265 A1 | 10/2007 | Park et al. |
| 2007/0250930 A1 | 10/2007 | Aziz et al. |
| 2007/0300061 A1 | 12/2007 | Kim et al. |
| 2008/0002697 A1 | 1/2008 | Anantharamaiah et al. |
| 2008/0005609 A1 * | 1/2008 | Zimmer ............... G06F 11/0748 714/5.11 |
| 2008/0022385 A1 | 1/2008 | Crowell et al. |
| 2008/0028389 A1 | 1/2008 | Genty et al. |
| 2008/0046708 A1 | 2/2008 | Fitzgerald et al. |

(56) References Cited

U.S. PATENT DOCUMENTS

| | | |
|---|---|---|
| 2008/0049633 A1 | 2/2008 | Edwards et al. |
| 2008/0056124 A1 | 3/2008 | Nanda et al. |
| 2008/0082662 A1 | 4/2008 | Danliker et al. |
| 2008/0101234 A1 | 5/2008 | Nakil et al. |
| 2008/0120350 A1 | 5/2008 | Grabowski et al. |
| 2008/0126534 A1 | 5/2008 | Mueller et al. |
| 2008/0141246 A1 | 6/2008 | Kuck et al. |
| 2008/0155245 A1 | 6/2008 | Lipscombe et al. |
| 2008/0250122 A1 | 10/2008 | Zsigmond et al. |
| 2008/0270199 A1 | 10/2008 | Chess et al. |
| 2008/0282347 A1 | 11/2008 | Dadhia et al. |
| 2008/0295163 A1 | 11/2008 | Kang |
| 2008/0301765 A1 | 12/2008 | Nicol et al. |
| 2009/0034543 A1* | 2/2009 | Thomas .............. G06F 11/1415 370/401 |
| 2009/0059934 A1 | 3/2009 | Aggarwal et al. |
| 2009/0064332 A1 | 3/2009 | Porras et al. |
| 2009/0109849 A1 | 4/2009 | Wood et al. |
| 2009/0133126 A1 | 5/2009 | Jang et al. |
| 2009/0138590 A1 | 5/2009 | Lee et al. |
| 2009/0180393 A1 | 7/2009 | Nakamura |
| 2009/0241170 A1 | 9/2009 | Kumar et al. |
| 2009/0292795 A1 | 11/2009 | Ford et al. |
| 2009/0296593 A1 | 12/2009 | Prescott |
| 2009/0300180 A1 | 12/2009 | Dehaan et al. |
| 2009/0307753 A1 | 12/2009 | Dupont et al. |
| 2009/0313373 A1 | 12/2009 | Hanna et al. |
| 2009/0313698 A1 | 12/2009 | Wahl |
| 2009/0319912 A1 | 12/2009 | Serr et al. |
| 2009/0323543 A1 | 12/2009 | Shimakura |
| 2009/0328219 A1 | 12/2009 | Narayanaswamy |
| 2010/0005288 A1 | 1/2010 | Rao et al. |
| 2010/0049839 A1 | 2/2010 | Parker et al. |
| 2010/0054241 A1 | 3/2010 | Shah et al. |
| 2010/0077445 A1 | 3/2010 | Schneider et al. |
| 2010/0095293 A1 | 4/2010 | O'Neill et al. |
| 2010/0095367 A1 | 4/2010 | Narayanaswamy |
| 2010/0095377 A1 | 4/2010 | Krywaniuk |
| 2010/0138526 A1 | 6/2010 | DeHaan et al. |
| 2010/0138810 A1 | 6/2010 | Komatsu et al. |
| 2010/0148940 A1 | 6/2010 | Gelvin et al. |
| 2010/0153316 A1 | 6/2010 | Duffield et al. |
| 2010/0153696 A1 | 6/2010 | Beachem et al. |
| 2010/0180016 A1 | 7/2010 | Bugwadia et al. |
| 2010/0194741 A1 | 8/2010 | Finocchio |
| 2010/0220584 A1 | 9/2010 | DeHaan et al. |
| 2010/0235514 A1 | 9/2010 | Beachem |
| 2010/0235879 A1 | 9/2010 | Burnside et al. |
| 2010/0235915 A1 | 9/2010 | Memon et al. |
| 2010/0287266 A1 | 11/2010 | Asati et al. |
| 2010/0303240 A1 | 12/2010 | Beachem |
| 2010/0306180 A1 | 12/2010 | Johnson et al. |
| 2010/0317420 A1 | 12/2010 | Hoffberg |
| 2010/0319060 A1 | 12/2010 | Aiken et al. |
| 2011/0004935 A1 | 1/2011 | Moffie et al. |
| 2011/0010585 A1 | 1/2011 | Bugenhagen et al. |
| 2011/0022641 A1 | 1/2011 | Werth et al. |
| 2011/0055381 A1 | 3/2011 | Narasimhan et al. |
| 2011/0055388 A1 | 3/2011 | Yumerefendi et al. |
| 2011/0066719 A1 | 3/2011 | Miryanov et al. |
| 2011/0069685 A1 | 3/2011 | Tofighbakhsh |
| 2011/0072119 A1 | 3/2011 | Bronstein et al. |
| 2011/0083125 A1 | 4/2011 | Komatsu et al. |
| 2011/0085556 A1 | 4/2011 | Breslin et al. |
| 2011/0103259 A1 | 5/2011 | Aybay et al. |
| 2011/0106528 A1* | 5/2011 | Maddison .............. H04L 67/24 704/9 |
| 2011/0107074 A1 | 5/2011 | Chan et al. |
| 2011/0107331 A1 | 5/2011 | Evans et al. |
| 2011/0126136 A1 | 5/2011 | Abella et al. |
| 2011/0126275 A1 | 5/2011 | Anderson et al. |
| 2011/0145885 A1 | 6/2011 | Rivers et al. |
| 2011/0153039 A1 | 6/2011 | Gvelesiani et al. |
| 2011/0153811 A1 | 6/2011 | Jeong et al. |
| 2011/0158088 A1 | 6/2011 | Lofstrand et al. |
| 2011/0170860 A1 | 7/2011 | Smith et al. |
| 2011/0173490 A1 | 7/2011 | Narayanaswamy et al. |
| 2011/0185423 A1 | 7/2011 | Sallam |
| 2011/0196957 A1 | 8/2011 | Ayachitula et al. |
| 2011/0202655 A1 | 8/2011 | Sharma et al. |
| 2011/0214174 A1 | 9/2011 | Herzog et al. |
| 2011/0225207 A1 | 9/2011 | Subramanian et al. |
| 2011/0228696 A1 | 9/2011 | Agarwal et al. |
| 2011/0238793 A1 | 9/2011 | Bedare et al. |
| 2011/0246663 A1 | 10/2011 | Melsen et al. |
| 2011/0277034 A1 | 11/2011 | Hanson |
| 2011/0283277 A1 | 11/2011 | Castillo et al. |
| 2011/0302652 A1 | 12/2011 | Westerfeld |
| 2011/0314148 A1 | 12/2011 | Petersen et al. |
| 2011/0317982 A1 | 12/2011 | Xu et al. |
| 2012/0005542 A1 | 1/2012 | Petersen et al. |
| 2012/0079592 A1 | 3/2012 | Pandrangi |
| 2012/0089664 A1 | 4/2012 | Igelka |
| 2012/0102361 A1 | 4/2012 | Sass et al. |
| 2012/0102543 A1 | 4/2012 | Kohli et al. |
| 2012/0110188 A1 | 5/2012 | Van Biljon et al. |
| 2012/0117226 A1 | 5/2012 | Tanaka et al. |
| 2012/0117642 A1 | 5/2012 | Lin et al. |
| 2012/0136996 A1 | 5/2012 | Seo et al. |
| 2012/0137278 A1 | 5/2012 | Draper et al. |
| 2012/0137361 A1 | 5/2012 | Yi et al. |
| 2012/0140626 A1 | 6/2012 | Anand et al. |
| 2012/0195198 A1 | 8/2012 | Regan |
| 2012/0197856 A1 | 8/2012 | Banka et al. |
| 2012/0198541 A1 | 8/2012 | Reeves |
| 2012/0216271 A1 | 8/2012 | Cooper et al. |
| 2012/0218989 A1 | 8/2012 | Tanabe et al. |
| 2012/0219004 A1 | 8/2012 | Balus et al. |
| 2012/0233348 A1 | 9/2012 | Winters |
| 2012/0233473 A1 | 9/2012 | Vasseur et al. |
| 2012/0240232 A1 | 9/2012 | Azuma |
| 2012/0246303 A1 | 9/2012 | Petersen et al. |
| 2012/0254109 A1 | 10/2012 | Shukla et al. |
| 2012/0260227 A1 | 10/2012 | Shukla et al. |
| 2012/0278021 A1 | 11/2012 | Lin et al. |
| 2012/0281700 A1 | 11/2012 | Koganti et al. |
| 2012/0300628 A1 | 11/2012 | Prescott et al. |
| 2013/0003538 A1 | 1/2013 | Greenburg et al. |
| 2013/0003733 A1 | 1/2013 | Venkatesan et al. |
| 2013/0006935 A1 | 1/2013 | Grisby |
| 2013/0007435 A1 | 1/2013 | Bayani |
| 2013/0038358 A1 | 2/2013 | Cook et al. |
| 2013/0041934 A1 | 2/2013 | Annamalaisami et al. |
| 2013/0054682 A1 | 2/2013 | Malik et al. |
| 2013/0085889 A1 | 4/2013 | Fitting et al. |
| 2013/0086272 A1 | 4/2013 | Chen et al. |
| 2013/0103827 A1 | 4/2013 | Dunlap et al. |
| 2013/0107709 A1 | 5/2013 | Campbell et al. |
| 2013/0124807 A1 | 5/2013 | Nielsen et al. |
| 2013/0125107 A1 | 5/2013 | Bandakka et al. |
| 2013/0145099 A1 | 6/2013 | Liu et al. |
| 2013/0148663 A1 | 6/2013 | Xiong |
| 2013/0159999 A1 | 6/2013 | Chiueh et al. |
| 2013/0173784 A1 | 7/2013 | Wang et al. |
| 2013/0174256 A1 | 7/2013 | Powers |
| 2013/0179487 A1 | 7/2013 | Lubetzky et al. |
| 2013/0179879 A1 | 7/2013 | Zhang et al. |
| 2013/0198517 A1 | 8/2013 | Mazzarella |
| 2013/0198839 A1 | 8/2013 | Wei et al. |
| 2013/0201986 A1 | 8/2013 | Sajassi et al. |
| 2013/0205293 A1 | 8/2013 | Levijarvi et al. |
| 2013/0219161 A1 | 8/2013 | Fontignie et al. |
| 2013/0219500 A1 | 8/2013 | Lukas et al. |
| 2013/0232498 A1 | 9/2013 | Mangtani et al. |
| 2013/0242999 A1 | 9/2013 | Kamble et al. |
| 2013/0246925 A1 | 9/2013 | Ahuja et al. |
| 2013/0247201 A1 | 9/2013 | Alperovitch et al. |
| 2013/0254879 A1 | 9/2013 | Chesla et al. |
| 2013/0268994 A1 | 10/2013 | Cooper et al. |
| 2013/0275579 A1 | 10/2013 | Hernandez et al. |
| 2013/0283374 A1 | 10/2013 | Zisapel et al. |
| 2013/0290521 A1 | 10/2013 | Labovitz |
| 2013/0297771 A1 | 11/2013 | Osterloh et al. |
| 2013/0301472 A1 | 11/2013 | Allan |

(56) References Cited

U.S. PATENT DOCUMENTS

| | | |
|---|---|---|
| 2013/0304900 A1 | 11/2013 | Trabelsi et al. |
| 2013/0305369 A1 | 11/2013 | Karta et al. |
| 2013/0318357 A1 | 11/2013 | Abraham et al. |
| 2013/0326623 A1 | 12/2013 | Kruglick |
| 2013/0333029 A1 | 12/2013 | Chesla et al. |
| 2013/0336164 A1 | 12/2013 | Yang et al. |
| 2013/0346736 A1 | 12/2013 | Cook et al. |
| 2013/0347103 A1 | 12/2013 | Veteikis et al. |
| 2014/0006610 A1 | 1/2014 | Formby et al. |
| 2014/0006871 A1 | 1/2014 | Lakshmanan et al. |
| 2014/0012814 A1 | 1/2014 | Bercovici et al. |
| 2014/0019972 A1 | 1/2014 | Yahalom et al. |
| 2014/0031005 A1 | 1/2014 | Sumcad et al. |
| 2014/0033193 A1 | 1/2014 | Palaniappan |
| 2014/0036688 A1 | 2/2014 | Stassinopoulos et al. |
| 2014/0040343 A1 | 2/2014 | Nickolov et al. |
| 2014/0047185 A1 | 2/2014 | Peterson et al. |
| 2014/0047372 A1 | 2/2014 | Gnezdov et al. |
| 2014/0056318 A1 | 2/2014 | Hansson et al. |
| 2014/0059200 A1 | 2/2014 | Nguyen et al. |
| 2014/0074946 A1 | 3/2014 | Dirstine et al. |
| 2014/0089494 A1 | 3/2014 | Dasari et al. |
| 2014/0092884 A1 | 4/2014 | Murphy et al. |
| 2014/0096058 A1 | 4/2014 | Molesky et al. |
| 2014/0105029 A1 | 4/2014 | Jain et al. |
| 2014/0115219 A1 | 4/2014 | Ajanovic et al. |
| 2014/0122674 A1* | 5/2014 | Gray ................ H04L 41/0846 709/222 |
| 2014/0129942 A1 | 5/2014 | Rathod |
| 2014/0137109 A1 | 5/2014 | Sharma et al. |
| 2014/0140244 A1 | 5/2014 | Kapadia et al. |
| 2014/0143825 A1 | 5/2014 | Behrendt et al. |
| 2014/0149490 A1 | 5/2014 | Luxenberg et al. |
| 2014/0156814 A1 | 6/2014 | Barabash et al. |
| 2014/0156861 A1 | 6/2014 | Cruz-Aguilar et al. |
| 2014/0164607 A1 | 6/2014 | Bai et al. |
| 2014/0165200 A1 | 6/2014 | Singla |
| 2014/0165207 A1 | 6/2014 | Engel et al. |
| 2014/0173623 A1 | 6/2014 | Chang et al. |
| 2014/0192639 A1 | 7/2014 | Smirnov |
| 2014/0201717 A1 | 7/2014 | Mascaro et al. |
| 2014/0215573 A1 | 7/2014 | Cepuran |
| 2014/0215621 A1 | 7/2014 | Xaypanya et al. |
| 2014/0224784 A1 | 8/2014 | Kohler |
| 2014/0225603 A1 | 8/2014 | Auguste et al. |
| 2014/0233387 A1 | 8/2014 | Zheng et al. |
| 2014/0269777 A1 | 9/2014 | Rothstein et al. |
| 2014/0280499 A1 | 9/2014 | Basavaiah et al. |
| 2014/0280920 A1* | 9/2014 | Foley ................ H04L 43/0817 709/224 |
| 2014/0281030 A1 | 9/2014 | Cui et al. |
| 2014/0286354 A1 | 9/2014 | Van De Poel et al. |
| 2014/0289854 A1 | 9/2014 | Mahvi |
| 2014/0298461 A1 | 10/2014 | Hohndel et al. |
| 2014/0307686 A1 | 10/2014 | Su et al. |
| 2014/0317278 A1 | 10/2014 | Kersch et al. |
| 2014/0317737 A1 | 10/2014 | Shin et al. |
| 2014/0330616 A1 | 11/2014 | Lyras |
| 2014/0331048 A1 | 11/2014 | Casas-Sanchez et al. |
| 2014/0331276 A1 | 11/2014 | Frascadore et al. |
| 2014/0331280 A1 | 11/2014 | Porras et al. |
| 2014/0331304 A1 | 11/2014 | Wong |
| 2014/0348182 A1 | 11/2014 | Chandra et al. |
| 2014/0351203 A1 | 11/2014 | Kunnatur et al. |
| 2014/0351415 A1 | 11/2014 | Harrigan et al. |
| 2014/0359695 A1 | 12/2014 | Chari et al. |
| 2015/0006689 A1 | 1/2015 | Szilagyi et al. |
| 2015/0006714 A1 | 1/2015 | Jain |
| 2015/0009840 A1 | 1/2015 | Pruthi et al. |
| 2015/0026809 A1 | 1/2015 | Altman et al. |
| 2015/0033305 A1 | 1/2015 | Shear et al. |
| 2015/0036480 A1 | 2/2015 | Huang et al. |
| 2015/0036533 A1 | 2/2015 | Sodhi et al. |
| 2015/0039751 A1 | 2/2015 | Harrigan et al. |
| 2015/0046882 A1 | 2/2015 | Menyhart et al. |
| 2015/0052441 A1 | 2/2015 | Degioanni |
| 2015/0058976 A1 | 2/2015 | Carney et al. |
| 2015/0067143 A1 | 3/2015 | Babakhan et al. |
| 2015/0067786 A1 | 3/2015 | Fiske |
| 2015/0082151 A1 | 3/2015 | Liang et al. |
| 2015/0082430 A1 | 3/2015 | Sridhara et al. |
| 2015/0085665 A1 | 3/2015 | Kompella et al. |
| 2015/0095332 A1 | 4/2015 | Beisiegel et al. |
| 2015/0112933 A1 | 4/2015 | Satapathy |
| 2015/0113133 A1 | 4/2015 | Srinivas et al. |
| 2015/0124608 A1 | 5/2015 | Agarwal et al. |
| 2015/0124652 A1 | 5/2015 | Dhamapurikar et al. |
| 2015/0128133 A1 | 5/2015 | Pohlmann |
| 2015/0128205 A1 | 5/2015 | Mahaffey et al. |
| 2015/0130359 A1* | 5/2015 | Bosua ................ H05B 37/0245 315/160 |
| 2015/0138993 A1 | 5/2015 | Forster et al. |
| 2015/0142962 A1 | 5/2015 | Srinivas et al. |
| 2015/0195291 A1 | 7/2015 | Zuk et al. |
| 2015/0222939 A1 | 8/2015 | Gallant et al. |
| 2015/0249622 A1 | 9/2015 | Phillips et al. |
| 2015/0256555 A1 | 9/2015 | Choi et al. |
| 2015/0261842 A1 | 9/2015 | Huang et al. |
| 2015/0261886 A1 | 9/2015 | Wu et al. |
| 2015/0271008 A1 | 9/2015 | Jain et al. |
| 2015/0271255 A1 | 9/2015 | Mackay et al. |
| 2015/0295945 A1 | 10/2015 | Canzanese, Jr. et al. |
| 2015/0312233 A1 | 10/2015 | Graham, III et al. |
| 2015/0347554 A1 | 12/2015 | Vasantham et al. |
| 2015/0356297 A1 | 12/2015 | Guri et al. |
| 2015/0358352 A1 | 12/2015 | Chasin et al. |
| 2016/0006753 A1 | 1/2016 | McDaid et al. |
| 2016/0019030 A1 | 1/2016 | Shukla et al. |
| 2016/0020959 A1 | 1/2016 | Rahaman |
| 2016/0021131 A1 | 1/2016 | Heilig |
| 2016/0026552 A1 | 1/2016 | Holden et al. |
| 2016/0036636 A1 | 2/2016 | Erickson et al. |
| 2016/0036837 A1 | 2/2016 | Jain et al. |
| 2016/0050132 A1 | 2/2016 | Zhang et al. |
| 2016/0072815 A1 | 3/2016 | Rieke et al. |
| 2016/0080414 A1 | 3/2016 | Kolton et al. |
| 2016/0087861 A1 | 3/2016 | Kuan et al. |
| 2016/0094394 A1 | 3/2016 | Sharma et al. |
| 2016/0094529 A1 | 3/2016 | Mityagin |
| 2016/0103692 A1 | 4/2016 | Guntaka et al. |
| 2016/0105350 A1 | 4/2016 | Greifeneder et al. |
| 2016/0112270 A1 | 4/2016 | Danait et al. |
| 2016/0112284 A1 | 4/2016 | Pon et al. |
| 2016/0119234 A1 | 4/2016 | Valencia Lopez et al. |
| 2016/0127395 A1 | 5/2016 | Underwood et al. |
| 2016/0147585 A1 | 5/2016 | Konig et al. |
| 2016/0162308 A1 | 6/2016 | Chen et al. |
| 2016/0162312 A1 | 6/2016 | Doherty et al. |
| 2016/0173446 A1 | 6/2016 | Nantel |
| 2016/0173535 A1 | 6/2016 | Barabash et al. |
| 2016/0183093 A1 | 6/2016 | Vaughn et al. |
| 2016/0191476 A1 | 6/2016 | Schutz et al. |
| 2016/0205002 A1 | 7/2016 | Rieke et al. |
| 2016/0216994 A1 | 7/2016 | Sefidcon et al. |
| 2016/0217022 A1 | 7/2016 | Velipasaoglu et al. |
| 2016/0224298 A1* | 8/2016 | Nogawa ................ H04N 1/00 |
| 2016/0255082 A1 | 9/2016 | Rathod |
| 2016/0269424 A1 | 9/2016 | Chandola et al. |
| 2016/0269442 A1 | 9/2016 | Shieh |
| 2016/0269482 A1 | 9/2016 | Jamjoom et al. |
| 2016/0294691 A1 | 10/2016 | Joshi |
| 2016/0308908 A1 | 10/2016 | Kirby et al. |
| 2016/0337204 A1 | 11/2016 | Dubey et al. |
| 2016/0357424 A1 | 12/2016 | Pang et al. |
| 2016/0357546 A1 | 12/2016 | Chang et al. |
| 2016/0357587 A1 | 12/2016 | Yadav et al. |
| 2016/0357957 A1 | 12/2016 | Deen et al. |
| 2016/0359592 A1 | 12/2016 | Kulshreshtha et al. |
| 2016/0359628 A1 | 12/2016 | Singh et al. |
| 2016/0359658 A1 | 12/2016 | Yadav et al. |
| 2016/0359673 A1 | 12/2016 | Gupta et al. |
| 2016/0359677 A1 | 12/2016 | Kulshreshtha et al. |
| 2016/0359678 A1 | 12/2016 | Madani et al. |
| 2016/0359679 A1 | 12/2016 | Parasdehgheibi et al. |

(56) References Cited

U.S. PATENT DOCUMENTS

| | | |
|---|---|---|
| 2016/0359680 A1 | 12/2016 | Parasdehgheibi et al. |
| 2016/0359686 A1 | 12/2016 | Parasdehgheibi et al. |
| 2016/0359695 A1 | 12/2016 | Yadav et al. |
| 2016/0359696 A1 | 12/2016 | Yadav et al. |
| 2016/0359697 A1 | 12/2016 | Scheib et al. |
| 2016/0359698 A1 | 12/2016 | Deen et al. |
| 2016/0359699 A1 | 12/2016 | Gandham et al. |
| 2016/0359700 A1 | 12/2016 | Pang et al. |
| 2016/0359701 A1 | 12/2016 | Pang et al. |
| 2016/0359703 A1 | 12/2016 | Gandham et al. |
| 2016/0359704 A1 | 12/2016 | Gandham et al. |
| 2016/0359705 A1 | 12/2016 | Parasdehgheibi et al. |
| 2016/0359708 A1 | 12/2016 | Gandham et al. |
| 2016/0359709 A1 | 12/2016 | Deen et al. |
| 2016/0359711 A1 | 12/2016 | Deen et al. |
| 2016/0359712 A1 | 12/2016 | Alizadeh Attar et al. |
| 2016/0359740 A1 | 12/2016 | Parasdehgheibi et al. |
| 2016/0359759 A1 | 12/2016 | Singh et al. |
| 2016/0359872 A1 | 12/2016 | Yadav et al. |
| 2016/0359877 A1 | 12/2016 | Kulshreshtha et al. |
| 2016/0359878 A1 | 12/2016 | Prasad et al. |
| 2016/0359879 A1 | 12/2016 | Deen et al. |
| 2016/0359880 A1 | 12/2016 | Pang et al. |
| 2016/0359881 A1 | 12/2016 | Yadav et al. |
| 2016/0359888 A1 | 12/2016 | Gupta et al. |
| 2016/0359889 A1 | 12/2016 | Yadav et al. |
| 2016/0359890 A1 | 12/2016 | Deen et al. |
| 2016/0359891 A1 | 12/2016 | Pang et al. |
| 2016/0359897 A1 | 12/2016 | Yadav et al. |
| 2016/0359905 A1 | 12/2016 | Touboul et al. |
| 2016/0359912 A1 | 12/2016 | Gupta et al. |
| 2016/0359913 A1 | 12/2016 | Gupta et al. |
| 2016/0359914 A1 | 12/2016 | Deen et al. |
| 2016/0359915 A1 | 12/2016 | Gupta et al. |
| 2016/0359917 A1 | 12/2016 | Rao et al. |
| 2016/0373481 A1 | 12/2016 | Sultan et al. |
| 2016/0380865 A1 | 12/2016 | Dubai et al. |
| 2017/0006141 A1 | 1/2017 | Bhadra |
| 2017/0024453 A1 | 1/2017 | Raja et al. |
| 2017/0032310 A1 | 2/2017 | Mimnaugh |
| 2017/0034018 A1 | 2/2017 | Parasdehgheibi et al. |
| 2017/0048121 A1 | 2/2017 | Hobbs et al. |
| 2017/0070582 A1 | 3/2017 | Desai et al. |
| 2017/0085483 A1 | 3/2017 | Mihaly et al. |
| 2017/0208487 A1 | 7/2017 | Ratakonda et al. |
| 2017/0250880 A1 | 8/2017 | Akens et al. |
| 2017/0250951 A1 | 8/2017 | Wang et al. |
| 2017/0289067 A1 | 10/2017 | Lu et al. |
| 2017/0295141 A1 | 10/2017 | Thubert et al. |
| 2017/0302691 A1 | 10/2017 | Singh et al. |
| 2017/0331747 A1 | 11/2017 | Singh et al. |
| 2017/0346736 A1 | 11/2017 | Chander et al. |
| 2017/0364380 A1 | 12/2017 | Frye, Jr. et al. |
| 2018/0006911 A1 | 1/2018 | Dickey |
| 2018/0007115 A1 | 1/2018 | Nedeltchev et al. |
| 2018/0013670 A1 | 1/2018 | Kapadia et al. |
| 2018/0145906 A1 | 5/2018 | Yadav et al. |
| 2018/0309651 A1* | 10/2018 | Kim ............... H04L 12/2803 |

FOREIGN PATENT DOCUMENTS

| | | |
|---|---|---|
| CN | 102521537 | 6/2012 |
| CN | 103023970 | 4/2013 |
| CN | 103716137 | 4/2014 |
| CN | 104065518 | 9/2014 |
| CN | 107196807 | 9/2017 |
| EP | 0811942 | 12/1997 |
| EP | 1076848 | 7/2002 |
| EP | 1383261 | 1/2004 |
| EP | 1450511 | 8/2004 |
| EP | 2045974 | 4/2008 |
| EP | 2043320 | 4/2009 |
| EP | 2860912 | 4/2015 |
| EP | 2887595 | 6/2015 |
| JP | 2009-016906 | 1/2009 |
| KR | 1394338 | 5/2014 |
| WO | WO 2007/014314 | 2/2007 |
| WO | WO 2007/070711 | 6/2007 |
| WO | WO 2008/069439 | 6/2008 |
| WO | WO 2013/030830 | 3/2013 |
| WO | WO 2015/042171 | 3/2015 |
| WO | WO 2015/099778 | 7/2015 |
| WO | WO 2016/004075 | 1/2016 |
| WO | WO 2016/019523 | 2/2016 |

OTHER PUBLICATIONS

Australian Government Department of Defence, Intelligence and Security, "Top 4 Strategies to Mitigate Targeted Cyber Intrusions," Cyber Security Operations Centre Jul. 2013, http://www.asd.gov.au/infosec/top-mitigations/top-4-strategies-explained.htm.

Author Unknown, "Blacklists & Dynamic Reputation: Understanding Why the Evolving Threat Eludes Blacklists," www.dambala.com, 9 pages, Dambala, Atlanta, GA, USA.

Aydin, Galip, et al., "Architecture and Implementation of a Scalable Sensor Data Storage and Analysis Using Cloud Computing and Big Data Technologies," Journal of Sensors, vol. 2015, Article ID 834217, Feb. 2015, 11 pages.

Backes, Michael, et al., "Data Lineage in Malicious Environments," IEEE 2015, pp. 1-13.

Bauch, Petr, "Reader's Report of Master's Thesis, Analysis and Testing of Distributed NoSQL Datastore Riak," May 28, 2015, Brno. 2 pages.

Bayati, Mohsen, et al., "Message-Passing Algorithms for Sparse Network Alignment," Mar. 2013, 31 pages.

Berezinski, Przemyslaw, et al., "An Entropy-Based Network Anomaly Detection Method," Entropy, 2015, vol. 17, www.mdpi.com/journal/entropy, pp. 2367-2408.

Berthier, Robin, et al. "Nfsight: Netflow-based Network Awareness Tool," 2010, 16 pages.

Bhuyan, Dhiraj, "Fighting Bots and Botnets," 2006, pp. 23-28.

Blair, Dana, et al., U.S. Appl. No. 62/106,006, filed Jan. 21, 2015, entitled "Monitoring Network Policy Compliance."

Bosch, Greg, "Virtualization," 2010, 33 pages.

Breen, Christopher, "MAC 911, How to dismiss Mac App Store Notifications," Macworld.com, Mar. 24, 2014, 3 pages.

Chandran, Midhun, et al., "Monitoring in a Virtualized Environment," GSTF International Journal on Computing, vol. 1, No. 1, Aug. 2010.

Chari, Suresh, et al., "Ensuring continuous compliance through reconciling policy with usage," Proceedings of the 18th ACM symposium on Access control models and technologies (SACMAT '13). ACM, New York, NY, USA, 49-60.

Chen, Xu, et al., "Automating network application dependency discovery: experiences, limitations, and new solutions," 8th USENIX conference on Operating systems design and implementation (OSDI'08), USENIX Association, Berkeley, CA, USA, 117-130.

Chou, C.W., et al., "Optical Clocks and Relativity," Science vol. 329, Sep. 24, 2010, pp. 1630-1633.

Cisco Systems, "Cisco Network Analysis Modules (NAM) Tutorial," Cisco Systems, Inc., Version 3.5.

Cisco Systems, Inc., "Addressing Compliance from One Infrastructure: Cisco Unified Compliance Solution Framework," 2014.

Cisco Systems, Inc., "Cisco Application Dependency Mapping Service," 2009.

Cisco Systems, Inc., "White Paper—New Cisco Technologies Help Customers Achieve Regulatory Compliance," 1992-2008.

Cisco Systems, Inc., "A Cisco Guide to Defending Against Distributed Denial of Service Attacks," May 3, 2016, 34 pages.

Cisco Systems, Inc., "Cisco Application Visibility and Control," Oct. 2011, 2 pages.

Cisco Systems, Inc., "Cisco Tetration Platform Data Sheet", Updated Mar. 5, 2018, 21 pages.

Cisco Technology, Inc., "Cisco Lock-and-Key:Dynamic Access Lists," http://www/cisco.com/c/en/us/support/docs/security-vpn/lock-key/7604-13.html; Updated Jul. 12, 2006, 16 pages.

(56) References Cited

OTHER PUBLICATIONS

Di Lorenzo, Guisy, et al., "EXSED: An Intelligent Tool for Exploration of Social Events Dynamics from Augmented Trajectories," Mobile Data Management (MDM), pp. 323-330, Jun. 3-6, 2013.
Duan, Yiheng, et al., Detective: Automatically Identify and Analyze Malware Processes in Forensic Scenarios via DLLs, IEEE ICC 2015—Next Generation Networking Symposium, pp. 5691-5696.
Feinstein, Laura, et al., "Statistical Approaches to DDoS Attack Detection and Response," Proceedings of the DARPA Information Survivability Conference and Exposition (DISCEX '03), Apr. 2003, 12 pages.
George, Ashley, et al., "NetPal: A Dynamic Network Administration Knowledge Base," 2008, pp. 1-14.
Goldsteen, Abigail, et al., "A Tool for Monitoring and Maintaining System Trustworthiness at Run Time," REFSQ (2015), pp. 142-147.
Hamadi, S., et al., "Fast Path Acceleration for Open vSwitch in Overlay Networks," Global Information Infrastructure and Networking Symposium (GIIS), Montreal, QC, pp. 1-5, Sep. 15-19, 2014.
Heckman, Sarah, et al., "On Establishing a Benchmark for Evaluating Static Analysis Alert Prioritization and Classification Techniques," IEEE, 2008; 10 pages.
Hewlett-Packard, "Effective use of reputation intelligence in a security operations center," Jul. 2013, 6 pages.
Hideshima, Yusuke, et al., "STARMINE: A Visualization System for Cyber Attacks," https://www.researchgate.net/publication/221536306, Feb. 2006, 9 pages.
Huang, Hing-Jie, et al., "Clock Skew Based Node Identification in Wireless Sensor Networks," IEEE, 2008, 5 pages.
InternetPerils, Inc., "Control Your Internet Business Risk," 2003-2015, http://www.internetperils.com.
Ives, Herbert, E., et al., "An Experimental Study of the Rate of a Moving Atomic Clock," Journal of the Optical Society of America, vol. 28, No. 7, Jul. 1938, pp. 215-226.
Janoff, Christian, et al., "Cisco Compliance Solution for HIPAA Security Rule Design and Implementation Guide," Cisco Systems, Inc., Updated Nov. 14, 2015, part 1 of 2, 350 pages.
Janoff, Christian, et al., "Cisco Compliance Solution for HIPAA Security Rule Design and Implementation Guide," Cisco Systems, Inc., Updated Nov. 14, 2015, part 2 of 2, 588 pages.
Kerrison, Adam, et al., "Four Steps to Faster, Better Application Dependency Mapping—Laying the Foundation for Effective Business Service Models," BMCSoftware, 2011.
Kim, Myung-Sup, et al. "A Flow-based Method for Abnormal Network Traffic Detection," IEEE, 2004, pp. 599-612.
Kraemer, Brian, "Get to know your data center with CMDB," TechTarget, Apr. 5, 2006, http://searchdatacenter.techtarget.com/news/118820/Get-to-know-your-data-center-with-CMDB.
Lab Sku, "VMware Hands-on Labs—HOL-SDC-1301" Version: 20140321-160709, 2013; http://docs.hol.vmware.com/HOL-2013/holsdc-1301_html_en/ (part 1 of 2).
Lab Sku, "VMware Hands-on Labs— HOL-SDC-1301" Version: 20140321-160709, 2013; http://docs.hol.vmware.com/HOL-2013/holsdc-1301_html_en/ (part 2 of 2).
Lachance, Michael, "Dirty Little Secrets of Application Dependency Mapping," Dec. 26, 2007.
Landman, Yoav, et al., "Dependency Analyzer," Feb. 14, 2008, http://jfrog.com/confluence/display/DA/Home.
Lee, Sihyung, "Reducing Complexity of Large-Scale Network Configuration Management," Ph.D. Dissertation, Carniege Mellon University, 2010.
Li, Ang, et al., "Fast Anomaly Detection for Large Data Centers," Global Telecommunications Conference (GLOBECOM 2010, Dec. 2010, 6 pages.
Li, Bingbong, et al, "A Supervised Machine Learning Approach to Classify Host Roles on Line Using sFlow," in Proceedings of the first edition workshop on High performance and programmable networking, 2013, ACM, New York, NY, USA, 53-60.
Liu, Ting, et al., "Impala: A Middleware System for Managing Autonomic, Parallel Sensor Systems," In Proceedings of the Ninth ACM SIGPLAN Symposium on Principles and Practice of Parallel Programming(PPoPP '03), ACM, New York, NY, USA, Jun. 11-13, 2003, pp. 107-118.
Lu, Zhonghai, et al., "Cluster-based Simulated Annealing for Mapping Cores onto 2D Mesh Networks on Chip," Design and Diagnostics of Electronic Circuits and Systems, pp. 1, 6, Apr. 16-18, 2008.
Matteson, Ryan, "Depmap: Dependency Mapping of Applications Using Operating System Events: a Thesis," Master's Thesis, California Polytechnic State University, Dec. 2010.
Natarajan, Arun, et al., "NSDMiner: Automated Discovery of Network Service Dependencies," Institute of Electrical and Electronics Engineers INFOCOM, Feb. 2012, 9 pages.
Navaz, A.S. Syed, et al., "Entropy based Anomaly Detection System to Prevent DDoS Attacks in Cloud," International Journal of computer Applications (0975-8887), vol. 62, No. 15, Jan. 2013, pp. 42-47.
Neverfail, "Neverfail IT Continuity Architect," 2015, https://web.archive.org/web/20150908090456/http://neverfailgroup.com/products/it-continuity-architect.
Nilsson, Dennis K., et al., "Key Management and Secure Software Updates in Wireless Process Control Environments," In Proceedings of the First ACM Conference on Wireless Network Security (WiSec '08), ACM, New York, NY, USA, Mar. 31-Apr. 2, 2008, pp. 100-108.
Nunnally, Troy, et al., "P3D: A Parallel 3D Coordinate Visualization for Advanced Network Scans," IEEE 2013, Jun. 9-13, 2013, 6 pages.
O'Donnell, Glenn, et al., "The CMDB Imperative: How to Realize the Dream and Avoid the Nightmares," Prentice Hall, Feb. 19, 2009.
Ohta, Kohei, et al., "Detection, Defense, and Tracking of Internet-Wide Illegal Access in a Distributed Manner," 2000, pp. 1-16.
Pathway Systems International Inc., "How Blueprints does Integration," Apr. 15, 2014, 9 pages, http://pathwaysystems.com/company-blog/.
Pathway Systems International Inc., "What is Blueprints?" 2010-2016, http://pathwaysystems.com/blueprints-about/.
Popa, Lucian, et al., "Macroscope: End-Point Approach to Networked Application Dependency Discovery," CoNEXT'09, Dec. 1-4, 2009, Rome, Italy, 12 pages.
Prasad, K. Munivara, et al., "An Efficient Detection of Flooding Attacks to Internet Threat Monitors (ITM) using Entropy Variations under Low Traffic," Computing Communication & Networking Technologies (ICCCNT '12), Jul. 26-28, 2012, 11 pages.
Sachan, Mrinmaya, et al., "Solving Electrical Networks to incorporate Supervision in Random Walks," May 13-17, 2013, pp. 109-110.
Sammarco, Matteo, et al., "Trace Selection for Improved WLAN Monitoring," Aug. 16, 2013, pp. 9-14.
Shneiderman, Ben, et al., "Network Visualization by Semantic Substrates," Visualization and Computer Graphics, vol. 12, No. 5, pp. 733,740, Sep.-Oct. 2006.
Thomas, R., "Bogon Dotted Decimal List," Version 7.0, Team Cymru NOC, Apr. 27, 2012, 5 pages.
Wang, Ru, et al., "Learning directed acyclic graphs via bootstarp aggregating," 2014, 47 pages, http://arxiv.org/abs/1406.2098.
Wang, Yongjun, et al., "A Network Gene-Based Framework for Detecting Advanced Persistent Threats," Nov. 2014, 7 pages.
Witze, Alexandra, "Special relativity aces time trial, 'Time dilation' predicted by Einstein confirmed by lithium ion experiment," Nature, Sep. 19, 2014, 3 pages.
Woodberg, Brad, "Snippet from Juniper SRX Series" Jun. 17, 2013, 1 page, O'Reilly Media, Inc.
Zatrochova, Zuzana, "Analysis and Testing of Distributed NoSQL Datastore Riak," Spring, 2015, 76 pages.
Zhang, Yue, et al., "CANTINA: A Content-Based Approach to Detecting Phishing Web Sites," May 8-12, 2007, pp. 639-648.
Al-Fuqaha, Ala, et al., "Internet of Things: A Survey on Enabling Technologies, Protocols, and Applications," IEEE Communication Surveys & Tutorials. vol. 17, No. 4, Nov. 18, 2015, pp. 2347-2376.
Baek, Kwang-Hyun, et al., "Preventing Theft of Quality of Service on Open Platforms," 2005 Workshop of the 1$^{st}$ International Con-

(56) References Cited

OTHER PUBLICATIONS ference on Security and Privacy for Emerging Areas in Communication Networks, 2005, 12 pages.
Brocade Communications Systems, Inc., "Chapter 5—Configuring Virtual LANs (VLANs)," Jun. 2009, 38 pages.
Cisco Systems, Inc. "Cisco, Nexus 3000 Series NX-OS Release Notes, Release 5.0(3)U3(1)," Feb. 29, 2012, Part No. OL-26631-01, 16 pages.
Cisco Systems, Inc., "Cisco—VPN Client User Guide for Windows," Release 4.6, Aug. 2004, 148 pages.
Cisco Systems, Inc., "Cisco 4710 Application Control Engine Appliance Hardware Installation Guide," Nov. 2007, 66 pages.
Cisco Systems, Inc., "Cisco Data Center Network Architecture and Solutions Overview," Feb. 2006, 19 pages.
Cisco Systems, Inc., "Cisco IOS Configuration Fundamentals Configuration Guide: *Using Autoinstall and Setup*," Release 12.2, first published Apr. 2001, last updated Sep. 2003, 32 pages.
Cisco Systems, Inc., "Cisco VN-Link: Virtualization-Aware Networking," White Paper, Mar. 2009, 10 pages.
Cisco Systems, Inc., "Cisco, Nexus 5000 Series and Cisco Nexus 2000 Series Release Notes, Cisco NX-OS Release 5.1(3)N2(1b), NX-OS Release 5.1(3)N2(1a) and NX-OS Release 5.1(3)N2(1)," Sep. 5, 2012, Part No. OL-26652-03 CO, 24 pages.
Cisco Systems, Inc., "Nexus 3000 Series NX-OS Fundamentals Configuration Guide, Release 5.0(3)U3(1): *Using PowerOn Auto Provisioning*," Feb. 29, 2012, Part No. OL-26544-01, 10 pages.
Cisco Systems, Inc., "Quick Start Guide, Cisco ACE 4700 Series Application Control Engine Appliance," Software Ve740rsion A5(1. 0), Sep. 2011, 138 pages.
Cisco Systems, Inc., "Routing and Bridging Guide, Cisco ACE Application Control Engine," Software Version A5(1.0), Sep. 2011, 248 pages.
Cisco Systems, Inc., "VMWare and Cisco Virtualization Solution: Scale Virtual Machine Networking," Jul. 2009, 4 pages.
Cisco Systems, Inc., "Cisco Remote Integrated Service Engine for Citrix NetScaler Appliances and Cisco Nexus 7000 Series Switches Configuration Guide," Last modified Apr. 29, 2014, 78 pages.
Cisco Technology, Inc., "Cisco IOS Software Release 12.4T Features and Hardware Support," Feb. 2009, 174 pages.
Cisco Systems, Inc., "Cisco Application Control Engine (ACE) Troubleshooting Guide—Understanding the ACE Module Architecture and Traffic Flow," Mar. 11, 2011, 6 pages.
Costa, Raul, et al., "An Intelligent Alarm Management System for Large-Scale Telecommunication Companies," In Portuguese Conference on Artificial Intelligence, Oct. 2009, 14 pages.
De Carvalho, Tiago Filipe Rodrigues, "Root Cause Analysis in Large and Complex Networks," Dec. 2008, Repositorio.ul.pt, pp. 1-55.
Foundation for Intelligent Physical Agents, "FIPA Agent Message Transport Service Specification," Dec. 3, 2002, http://www.fipa.org; 15 pages.
Gia, Tuan Nguyen, et al., "Fog Computing in Healthcare Internet of Things: A Case Study on ECG Feature Extraction," 2015 IEEE International Conference on Computer and Information Technology; Ubiquitous Computing and Communications; Dependable, Autonomic and Secure Computing; Pervasive Intelligence and Computing, Oct. 26, 2015, pp. 356-363.
Joseph, Dilip, et al., "Modeling Middleboxes," IEEE Network, Sep./Oct. 2008, pp. 20-25.
Kent, S., et al. "Security Architecture for the Internet Protocol," Network Working Group, Nov. 1998, 67 pages.
Online Collins English Dictionary, 1 page (Year: 2018).
Theodorakopoulos, George, et al., "On Trust Models and Trust Evaluation Metrics for Ad Hoc Networks," IEEE Journal on Selected Areas in Communications. vol. 24, Issue 2, Feb. 2006, pp. 318-328.
Voris, Jonathan, et al., "Bait and Snitch: Defending Computer Systems with Decoys," Columbia University Libraries, Department of Computer Science, 2013, pp. 1-25.
Zeng, Sai, et al., "Managing Risk in Multi-node Automation of Endpoint Management," 2014 IEEE Network Operations and Management Symposium (NOMS), 2014, 6 pages.

* cited by examiner

REMOTE DEVICE STATUS AUDIT AND RECOVERY

The present technology pertains to remote management of configuration settings on network devices.

BACKGROUND

Many network components/devices such as switches and access points that enable various types of user devices to connect to a network can be remotely controlled and configured. These devices may operate in any number of states and can have various configurations implemented thereby. A corresponding configuration is remotely generated and sent to one or more of these devices. For example, an access point can be remotely reconfigured to disable a protected/secure service set identifier (SSID). However, once the configuration is transmitted to the access point, instead of disabling the SSID, the access point, through implementation of its local computer-readable instructions, may fail to disable the SSID and instead can turn the access point into an insecure, open SSID to which unauthorized network traffic can be bridged, providing access to the underlying secure network by unauthorized devices. Currently, backend components that generate and send configuration data to devices such as the access point in the example above, can check to see if the currently installed configuration file on the access point is up-to-date or not. However, this check is insufficient to validate whether the actual setting (implemented by execution of local computer-readable instructions on the access point) are being implemented at the device correctly or not.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1A:
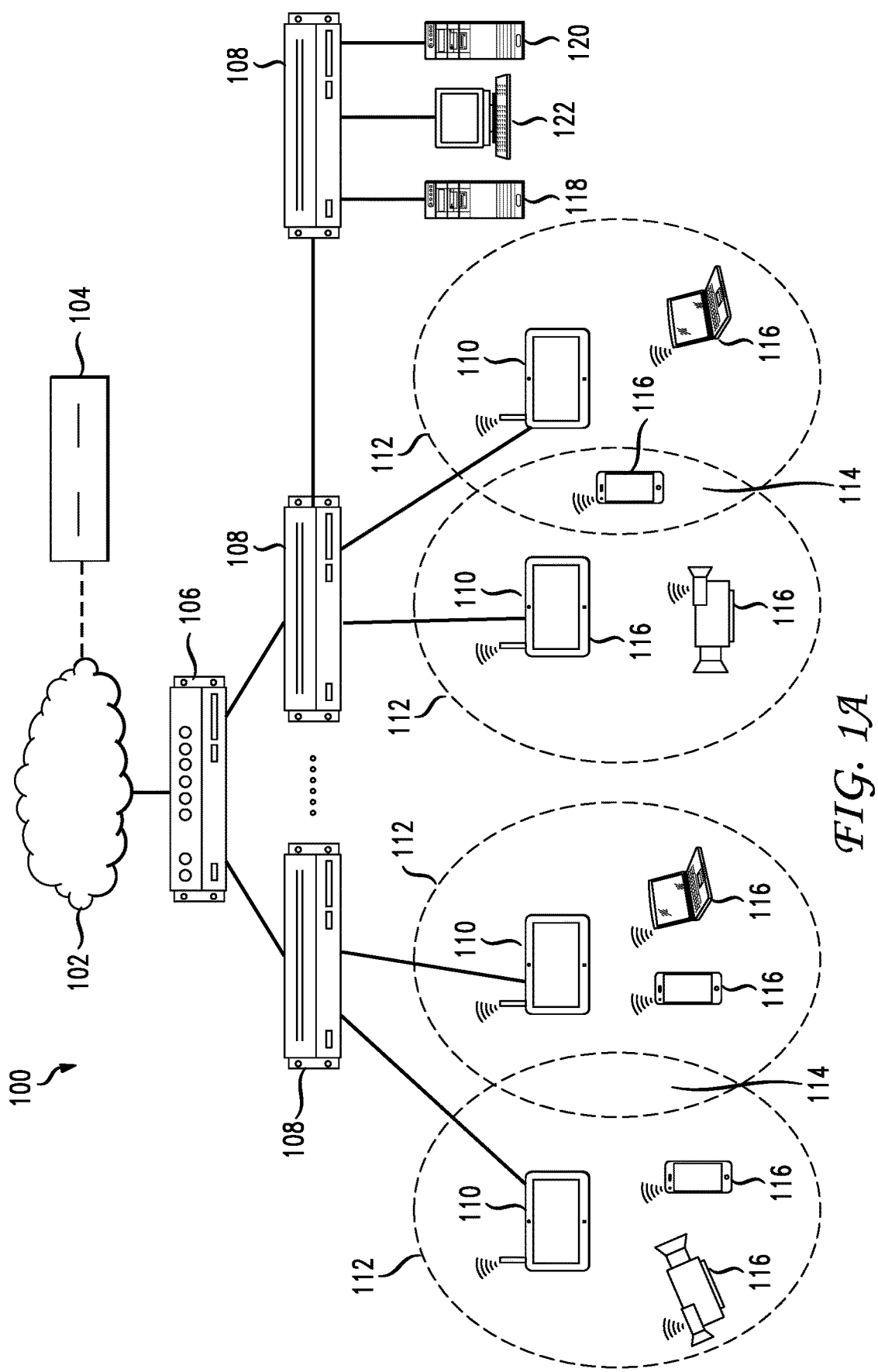
FIG. 1A illustrates an example wireless network environment, according to one aspect of the present disclosure.

Various examples of the disclosure are discussed in detail below. While specific implementations are discussed, it should be understood that this is done for illustration purposes only. A person skilled in the relevant art will recognize that other components and configurations may be used without parting from the spirit and scope of the disclosure.

References to one or an example embodiment in the present disclosure can be, but not necessarily are, references to the same example embodiment; and, such references mean at least one of the example embodiments.

Reference to "one example embodiment" or "an example embodiment" means that a particular feature, structure, or characteristic described in connection with the example embodiment is included in at least one example of the disclosure. The appearances of the phrase "in one example embodiment" in various places in the specification are not necessarily all referring to the same example embodiment, nor are separate or alternative example embodiments mutually exclusive of other example embodiments. Moreover, various features are described which may be exhibited by some example embodiments and not by others. Similarly, various features are described which may be features for some example embodiments but not other example embodiments.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various examples given in this specification.

Without intent to limit the scope of the disclosure, examples of instruments, apparatus, methods and their related results according to examples of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular examples only and is not intended to be limiting. As used herein, the singular forms "a", "an", and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of examples. However, it will be understood by one of ordinary skill in the art that examples may be practiced without these specific details. For example, systems may be shown in block diagrams so as not to obscure the examples in unnecessary detail. In other instances, well-known processes, structures and techniques may be shown without unnecessary detail in order to avoid obscuring examples.

In the following description, illustrative examples will be described with reference to acts and symbolic representations of operations (e.g., in the form of flow charts, flow diagrams, data flow diagrams, structure diagrams, block diagrams, etc.) that may be implemented as program services or functional processes include routines, programs, objects, components, data structures, etc., that perform particular tasks or implement particular abstract data types and may be implemented using hardware at network elements. Non-limiting examples of such hardware may include one or more Central Processing Units (CPUs), digital signal processors (DSPs), application-specific-integrated-circuits, field programmable gate arrays (FPGAs), computers or the like.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

In one aspect of the present disclosure, a method includes transmitting, by a controller, a request to a network device of the network for a status of operation of the network device with respect at least one configuration setting available at the network device; determining, by the controller, whether the status matches an operation status provided by the at least one configuration setting; and performing, by the controller, a recovery process to adjust the implementation of the at least one configuration setting when the determining determines that the status does not match the operation status.

In one aspect of the present disclosure, a system includes one or more processors and at least one computer-readable storage medium having instructions stored therein which, when executed by the one or more processors, cause the system to transmit a request to a network device of the network for a status of operation of the network device with respect at least one configuration setting available at the network device; determine whether the status matches an operation status provided by the at least one configuration setting; and a recovery process to adjust implementation of the at least one configuration setting when the determining determines that the status does not match the operation status.

In one aspect of the present disclosure, a non-transitory computer-readable storage medium having stored therein instructions which, when executed by one or more processors associated with a network controller, cause the network controller to transmit a request to a network device of the network for a status of operation of the network device with respect at least one configuration setting available at the network device; determine whether the status matches an operation status provided by the at least one configuration setting; and perform a recovery process to adjust implementation of the at least one configuration setting when the determining determines that the status does not match the operation status.

DESCRIPTION

Cloud networking provides centralized management, visibility, and control without the cost and complexity of controller appliances or overlay management software. Network components such as access points and switches can be built from the ground up for cloud management. These devices are capable of being centrally managed with centralized management and can be layer 7 devices with application visibility, real time web-based diagnostics, monitoring, reporting, etc.

As indicated above, currently utilized central management systems can only ensure that these remotely accessible network devices (e.g., switches, access points, etc.) have the latest version of corresponding/intended configuration files. These configuration files can be for any one of radio settings, port settings, encryption setting and any other type of setting of these network devices. However, a problem arises when the correct configuration files are sent to the network devices but the receiving network device(s) fail to implement the configurations correctly. For example, local computer-readable instructions running of a given one of receiving network devices may fail to properly implement the configuration file to disable a SSID network, as described above, thus turning a secure network into an insecure SSID network that can be accessed by any unauthorized device.

Examples described herein after, enable a central management component, implemented via cloud networking, ensure that each network component has properly executed and implemented configuration files and parameters sent thereto and upon detection of a failure of any network component in doing so, implement remedial measures to address this issue and prevent unauthorized access to the underlying network.

Figure 1B:
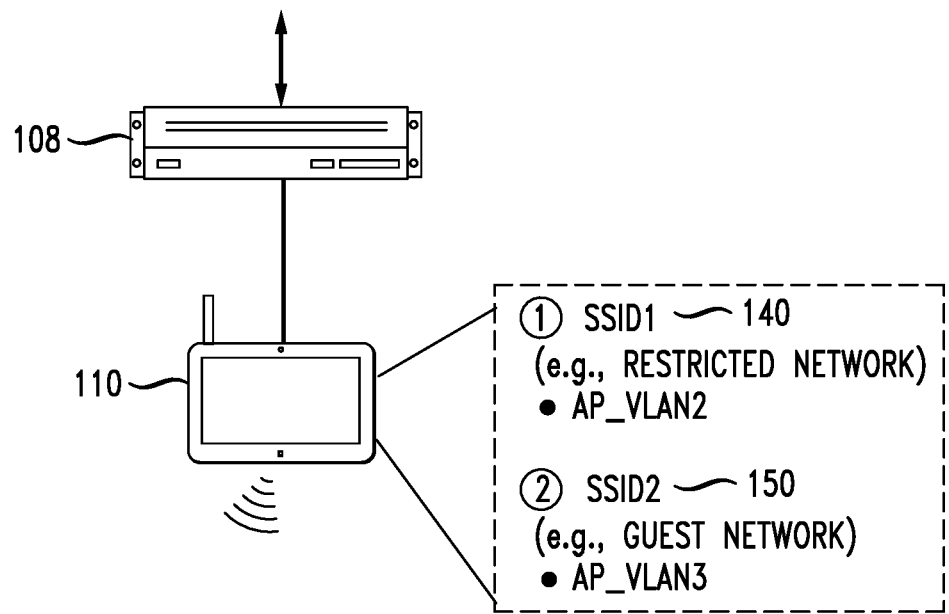
FIG. 1B illustrates a diagram of example networks deployed on the network environment of FIG. 1A, according to one aspect of the present disclosure.
Figure 2:
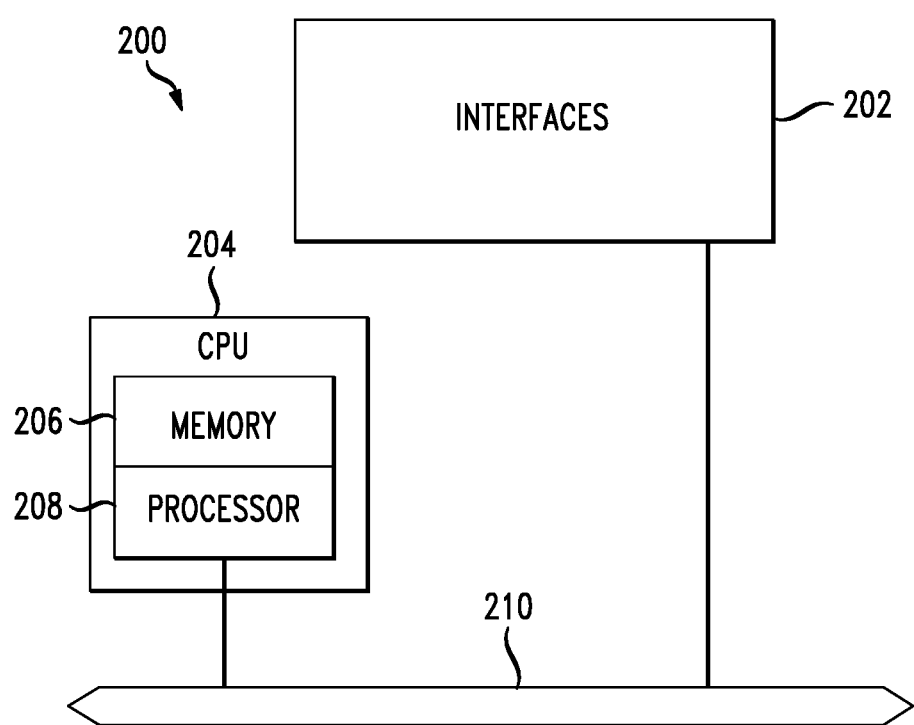
FIG. 2 illustrates an example network device suitable for performing switching, routing, load balancing, and other networking operations, according to an aspect of the present disclosure.
Figure 3:
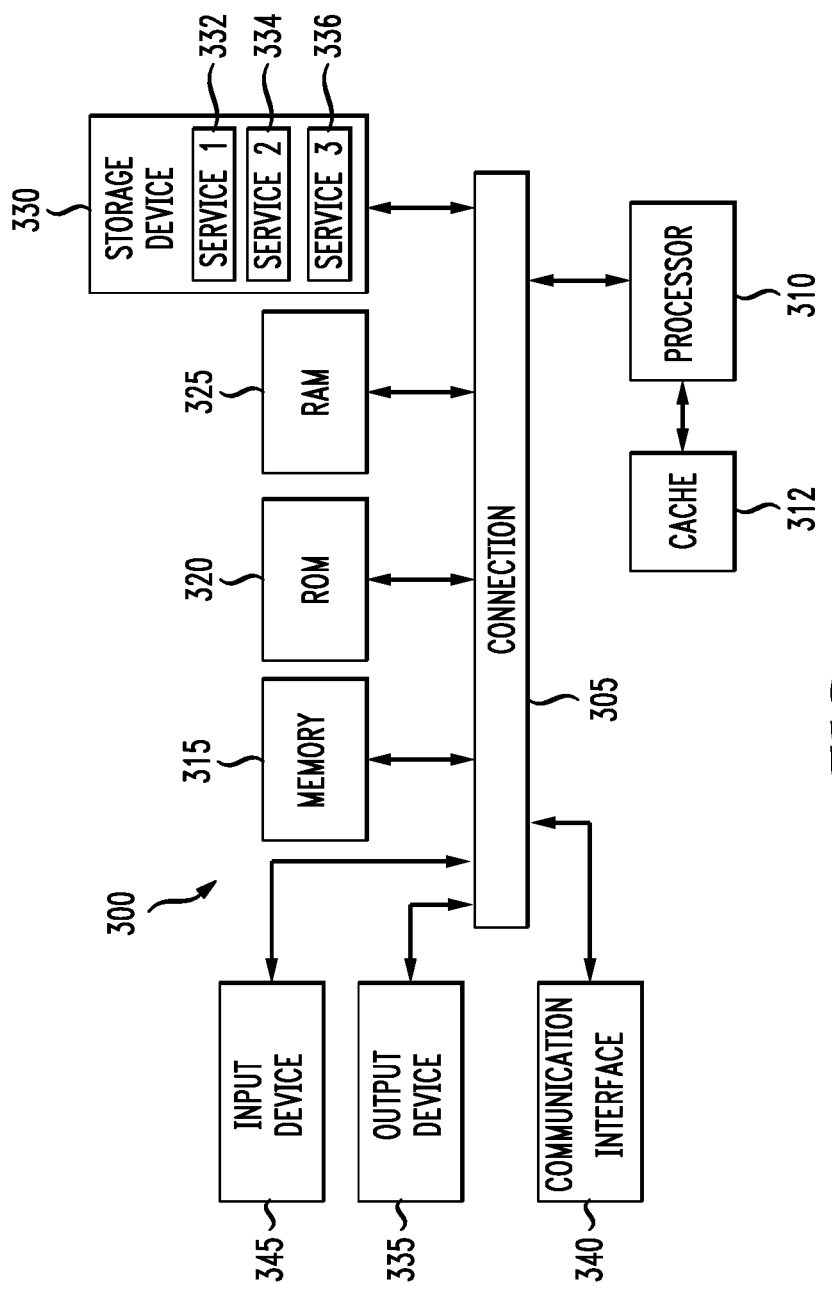
FIG. 3 illustrates a computing system architecture, according to an aspect of the present disclosure.

The present disclosure will be as follows. The discussion begins with an introductory discussion of example network environments, as illustrated in FIGS. 1A-B. The discussion continues with a description of example computing and network devices, as illustrated in FIGS. 2 and 3, including example hardware components suitable for hosting software applications and performing computing operations. Thereafter, examples will be described for addressing the deficiencies described above, with reference to FIG. 4. The disclosure now turns to FIG. 1A.

FIG. 1A illustrates an example network environment, according to one aspect of the present disclosure. The network environment 100 includes access points (APs) 110 for wirelessly connecting wireless clients 116 to the network environment. Wireless clients 116 can include any one of, but is not limited to, a mobile device, a tablet, a laptop, a camera, etc. In other words, wireless clients 116 can be any type of electronic device that can communicate with one of APs 110 and or other network nodes such as nodes 108, router 106, etc., via any known or to be developed wireless and/or wired communication schemes and means.

APs 110 can include hardware and software for transmitting and receiving wireless signals from other devices and supporting wireless communications and connectivity. APs 110 can broadcast one or more wireless networks deployed on the APs 110, allow the wireless clients 116 to access the one or more wireless networks, and bridge or route communications between the wireless clients 116 on the one or more wireless networks and the physical network(s), including other devices in and out of the network environment 100. In some cases, the APs 110 can broadcast the one or more wireless networks deployed on the APs 110 by transmitting the names or service set identifiers (SSIDs) of the one or more wireless networks. The APs 110 can also broadcast other information about the one or more wireless networks, such as channel information, band information, etc.

The APs 110 can have a respective range 112 for transmitting and/or receiving wireless communications. Those of the wireless clients 116 within the respective range 112 of an AP can communicate wirelessly with that AP and maintain such communications as they move within the respective range 112. In some cases, the APs 110 can be positioned such that the respective range 112 of two or more APs 110 can overlap to form an overlapping range 114. Moreover, the APs 110 can be position within communicative range of each other to create a mesh network configuration. The overlapping range 114 and/or mesh network configuration can allow a wireless client to roam outside the respective range of the AP that the wireless client is connected to, and experience minimal to no loss in connectivity. For example, a wireless client connected to AP1 can roam outside of the respective range of AP1 and into the respective range of AP2, and maintain connectivity through AP2. Thus, the wireless client can seamlessly hop from one AP to another during a communication session in order to avoid or limit service disruptions when the wireless client moves beyond the respective range of an AP.

For example, as a wireless client begins to roam toward the limits of an APs respective range, the wireless client may eventually reach an overlapping range 114 which places the wireless client within the respective range of multiple APs, thus allowing the wireless client to transmit and receive wireless signals from those APs 110 associated with the overlapping range 114. The wireless client can hop from one AP associated with the overlapping range to another AP associated with the overlapping range, and maintain connectivity (or limit disruption) as the wireless client roams outside of the respective range of one AP and into the respective range of another AP. The overlapping ranges 114 can provide zones for a "handoff" between APs, where connectivity with a wireless client is transferred from one AP to a different AP in order to continue the wireless clients' wireless communications via the different AP. Thus, the wireless clients 116 can move between respective ranges 112 and maintain wireless connectivity to the network environment 100.

The APs 110 can each be configured to service a single wireless network or multiple wireless networks. Each wireless network deployed on an AP can have a respective SSID which identifies the wireless network. For example, one or more of the APs 110 can provide connectivity to a first wireless network having a "Guest" SSID and a second wireless network having a "Restricted" SSID. The wireless clients 116 can connect to the Guest SSID or the Restricted SSID via those APs 110. Moreover, multiple APs 110 can host a same wireless network or SSID, but may also host other wireless networks or SSIDs. For example, all APs 110 may host a guest wireless network (e.g., Guest SSID), while only one or more APs 110 may host a specific, restricted wireless network (e.g., Restricted SSID).

Each wireless network can have one or more configuration settings defined for that wireless network based on the specific requirements or purpose of the wireless network. Non-limiting examples of configuration settings for wireless networks can include a communication channel, a band, an authentication requirement or mechanism (e.g., authorization enforced via a device's media access control (MAC) address, a remote authentication dial-in user service (RADIUS), a preshared key (PSK), 802.1x credentials, etc.), network access restrictions (e.g., which portions and/or resources of a network can be accessed, etc.), security or group policies (e.g., access control list configurations, etc.), network configurations (e.g., subnet, virtual LAN (VLAN), communication protocols, port forwarding, traffic filtering, etc.), etc. Furthermore, each AP 110 can have its own corresponding device configuration settings including, but not limited to, a port setting, a radio setting, an encryption setting, etc.

In some cases, the configuration and location of wireless networks and APs 110 can vary based on one or more factors, such as network requirements, geography, policies, physical restrictions, organizational structure, business factors, inter-office politics, etc. To illustrate, a wireless network associated with the SSID "Restricted Business Department" may be configured specifically to address the networking needs and authorization levels of users in the business department and/or may be deployed on APs located in the office of the business department, while a wireless network associated with the SSID "Guest Network" may be open to all users and hosted by all APs 100 in the network environment 100. Thus, different wireless networks, which can be represented by respective SSIDs, can be configured to separate users, clients, resources, and other aspects of a network.

Figure 1B:
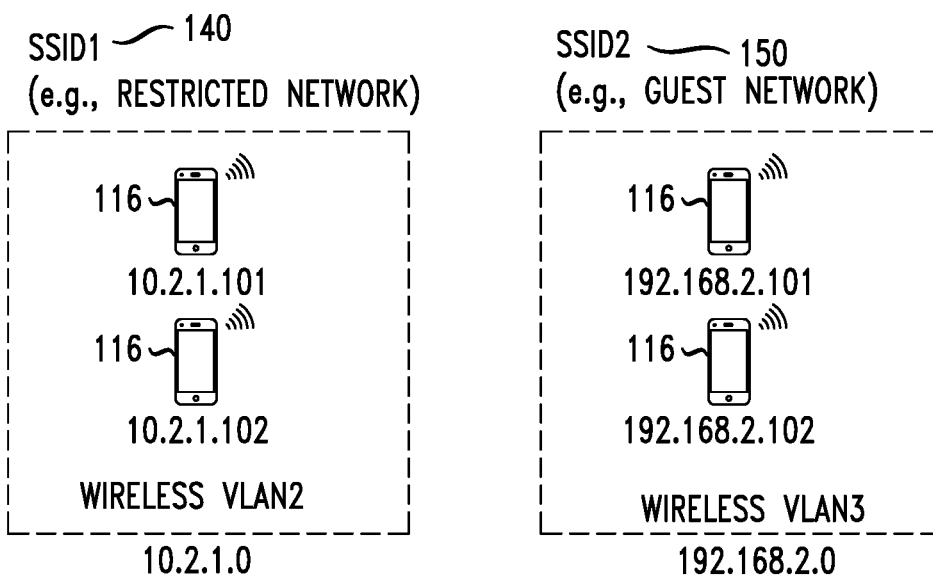

APs 110 can connect to nodes 108 to communicate with the physical network as well as other devices inside or outside of the network environment. Nodes 108 can be, for example, Layer 2 and/or Layer 3 network devices, such as switches or routers. In some cases, APs 110 can communicatively couple to nodes 108 via a physical link (e.g., wire or cable) between a respective port/interface on APs 110 and a respective port/interface on nodes 108. In some cases, APs 110 can communicatively couple to nodes 108 via any known or to be developed wireless communication scheme/protocol. Furthermore, as shown in FIG. 1, other example components such as server 118, desktop computer 120 and TV (e.g., internet-enabled TV) 122 can communicatively couple to nodes 108. In one example, servers 118 and desktop computer 120 are physically coupled (via any known or to be developed wired communication scheme) to corresponding node 108. Accordingly, APs 110, servers 118 and desktop computer 120 can be coupled to corresponding node(s) 108 via any known, or to be developed, wired and/or wireless communication means and schemes.

Nodes 108 can also connect to other network devices in the network. For example, nodes 108 can connect to a router 106 which can route communications to and from other networks and devices, such as network 102. Thus, traffic to and from the wireless clients 116 and other networks, such as network 102, can flow through router 106, nodes 108, and APs 110, and wirelessly between the wireless clients 116 and APs 110.

Network 102 can include a private network, such as a local area network (LAN) or a private cloud; a public network such as the Internet or a public cloud; and/or a hybrid network such as a virtual private network (VPN), a hybrid cloud, etc. In some cases, network 102 can be a cloud configured to communicate with network environment 100 through router 106 to provide one or more services (e.g., firewall services, intrusion detection services, infrastructure services, management services, monitoring services, authentication services, backup services, configuration or automation services, etc.) to any of devices 106, 108, 110, and 112 in network environment 100.

For example, network 102 can include one or more clouds hosting one or more controllers 104. Controller 104 can be, for example, a network appliance (e.g., a service or application; a physical element, such as a physical server or switch; a virtual element such as a virtual machine, a software container, a virtual device, a virtual network function (VNF), a virtual network service chain; etc.) configured to monitor and manage network configurations and conditions in the network environment 100. Thus, network 102 can include one or more controllers 104 configured to provide services, such as monitoring and configuration management services, to devices in the network environment 100. To illustrate, controller 104 in network 102 can be configured to provide authentication, authorization, and accounting (AAA) services and/or other networking services for the wireless clients 116 and the network environment 100, such as remote management services. Remote management services can include, without limitation, monitoring services, deployment services, configuration services, troubleshooting services, automated services, update services, and other networking services. Configuration parameters and files described above can be transmitted to router 106, nodes 108 and APs 110 by controller 104.

Controller 104 is illustrated in FIG. 1A as a single controller or device for the sake of clarity and explanation purposes. It should be noted that controller 104 can represent one or more controllers, devices, applications, appliances, elements, etc. For example, in some examples, controller 104 can be a single controller, a distributed controller, a cluster of controllers, a plurality of controllers, etc.

FIG. 1B illustrates a diagram of example wireless networks deployed on the network environment of FIG. 1, according to one aspect of the present disclosure. In this example, AP 110 is configured to host multiple wireless networks, represented in this example by $SSID_1$ 140 and $SSID_2$ 150. $SSID_1$ 140 is a restricted wireless network, which may require user authentication for access and may provide access to restricted network resources (e.g., printers, shares, files, databases, applications, intranet, etc.) upon access. $SSID_2$ 150 is a guest wireless network that is open to all users and/or available with limited authentication requirements. For the sake of clarity and explanation purposes, $SSID_1$ 140 will be referenced herein as "Restricted $SSID_1$ 140", and $SSID_2$ 150 will be referenced herein as "Guest $SSID_2$ 150".

Given the reduced authentication and security requirements of Guest $SSID_2$ 150, access to network resources in network environment 100 from Guest $SSID_2$ 150 may be limited, such as access to printers, shares, files, databases, applications, intranet, etc. In some cases, Guest $SSID_2$ 150 may only provide Internet connectivity, and thus may restrict access to all other network resources. For example, Guest $SSID_2$ 150 can provide a means for unauthenticated users and guests to access the Internet from their wireless devices for convenience, while preventing unauthenticated users from accessing other resources on the network.

In some cases, Restricted $SSID_1$ 140 and Guest $SSID_2$ 150 can have different network addressing configurations in order to segregate traffic and users between the wireless networks, whereas mentioned above, the addressing configuration instructions may be remotely provided to AP 110 by controller 104 of network 102. For example, Restricted $SSID_1$ 140 and Guest $SSID_2$ 150 can reside on different VLANs, subnets, etc. Wireless clients 116 can connect to Restricted $SSID_1$ 140 or Guest $SSID_2$ 150 via AP 110. As previously mentioned, network configurations, security, policies, authentication, etc., applied to wireless clients 116 will depend on which of the Restricted $SSID_1$ 140 or the Guest $SSID_2$ 150 they connect to and can be provided remotely by controller 104.

The disclosure now turns to FIGS. 2 and 3, which illustrate example network devices and computing devices, such as switches, routers, load balancers, client devices, and so forth.

FIG. 2 illustrates an example network device suitable for performing switching, routing, load balancing, and other networking operations, according to an aspect of the present disclosure. In one example, network device 200 can be the same as any one of AP 110, nodes 108 and switch 106. Network device 200 includes a central processing unit (CPU) 204, interfaces 202, and a bus 210 (e.g., a PCI bus). When acting under the control of appropriate software or firmware, CPU 204 is responsible for executing packet management, error detection, and/or routing functions. CPU 204 preferably accomplishes all these functions under the control of software including an operating system and any appropriate applications software. CPU 204 may include one or more processors 208, such as a processor from the INTEL X86 family of microprocessors. In some cases, processor 208 can be specially designed hardware for controlling the operations of network device 600. In some cases, a memory 606 (e.g., non-volatile RAM, ROM, etc.) also forms part of CPU 604. However, there are many different ways in which memory could be coupled to the system.

Interfaces 202 are typically provided as modular interface cards (sometimes referred to as "line cards"). Generally, they control the sending and receiving of data packets over the network and sometimes support other peripherals used with network device 200. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 604 to efficiently perform routing computations, network diagnostics, security functions, etc.

Although the system shown in FIG. 2 is one specific network device of the present invention, it is by no means the only network device architecture on which the present invention can be implemented. For example, an architecture having a single processor that handles communications as well as routing computations, etc., is often used. Further, other types of interfaces and media could also be used with network device 200.

Regardless of the network device's configuration, it may employ one or more memories or memory modules (including memory 206) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 206 could also hold various software containers and virtualized execution environments and data.

Network device 200 can also include an application-specific integrated circuit (ASIC), which can be configured to perform routing and/or switching operations. The ASIC can communicate with other components in network device 200 via bus 210, to exchange data and signals and coordinate various types of operations by network device 200, such as routing, switching, and/or data storage operations, for example.

FIG. 3 illustrates a computing system architecture, according to an aspect of the present disclosure. As shown in FIG. 3, components of system 300 are in electrical communication with each other using a connection 305, such as a bus. Exemplary system 300 includes a processing unit (CPU or processor) 310 and a system connection 305 that couples various system components including system memory 315, such as read only memory (ROM) 320 and random access memory (RAM) 325, to processor 710. System 300 can include a cache of high-speed memory connected directly with, in close proximity to, or integrated as part of the processor 310. System 300 can copy data from memory 315 and/or storage device 330 to cache 312 for quick access by processor 310. In this way, the cache can provide a performance boost that avoids processor 310 delays while waiting for data. These and other modules can control or be configured to control the processor 310 to perform various actions. Other system memory 315 may be available for use as well. Memory 315 can include multiple different types of memory with different performance characteristics. Processor 310 can include any general purpose processor and a hardware or software service, such as Service 1 332, Service 2 334, and Service 3 336 stored in storage device 330, configured to control processor 310 as well as a special-purpose processor where software instructions are incorporated into the actual processor design. Processor 310 may be a completely self-contained computing system, containing multiple cores or processors, a bus, memory controller, cache, etc. A multi-core processor may be symmetric or asymmetric.

To enable user interaction with the computing device 300, an input device 345 can represent any number of input mechanisms, such as a microphone for speech, a touch-sensitive screen for gesture or graphical input, keyboard, mouse, motion input, speech and so forth. An output device 335 can also be one or more of a number of output mechanisms known to those of skill in the art. In some instances, multimodal systems can enable a user to provide multiple types of input to communicate with computing device 300. The communications interface 340 can generally govern and manage the user input and system output. There is no restriction on operating on any particular hardware arrangement and therefore the basic features here may easily be substituted for improved hardware or firmware arrangements as they are developed.

Storage device 330 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 325, read only memory (ROM) 320, and hybrids thereof.

The storage device 330 can include services 332, 334, 336 for controlling the processor 310. Other hardware or software modules are contemplated. The storage device 330 can be connected to the system connection 305. In one aspect, a hardware module that performs a particular function can include the software component stored in a computer-readable medium in connection with the necessary hardware components, such as the processor 310, connection 305, output device 335, and so forth, to carry out the function.

Figure 4:
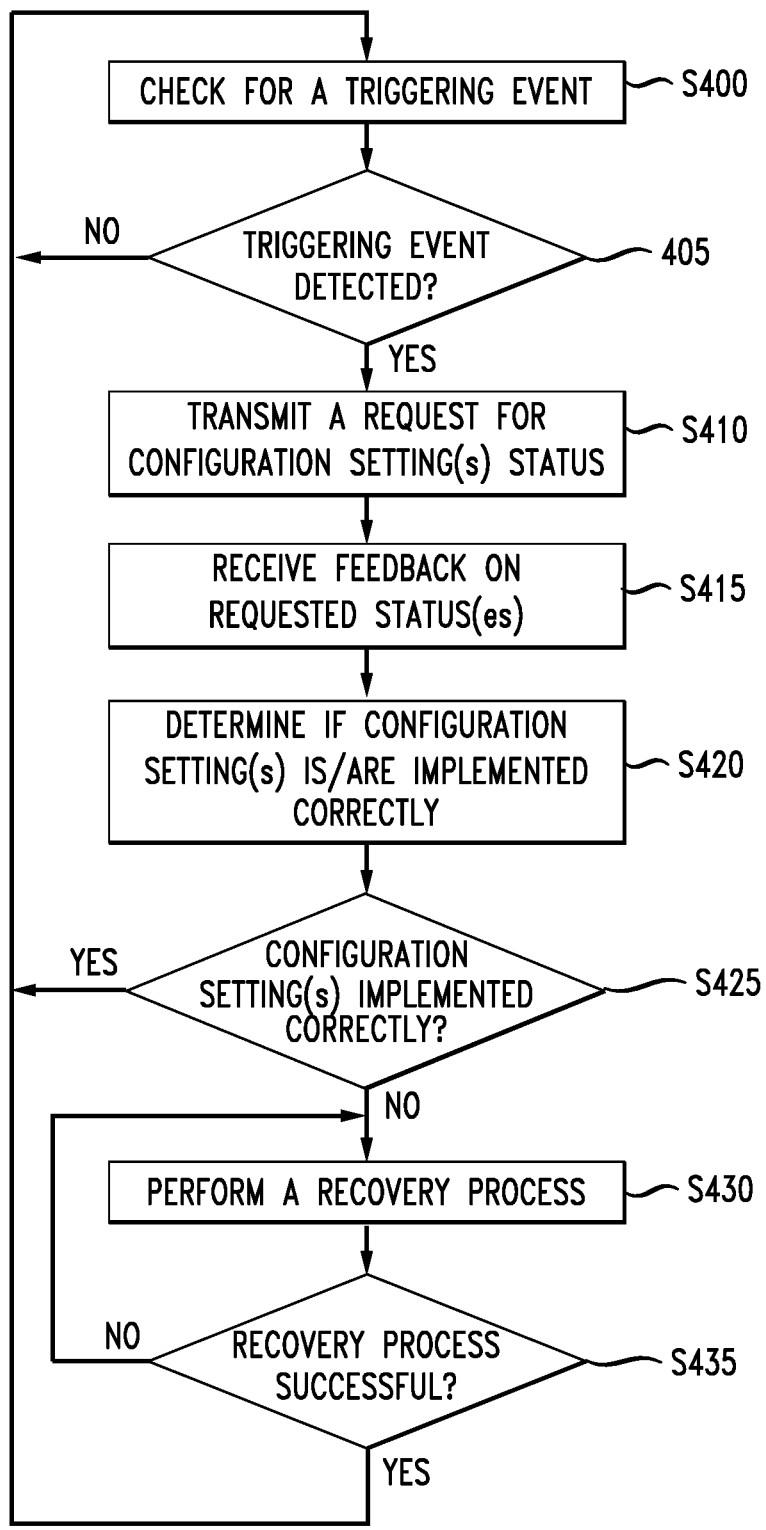
FIG. 4 illustrates a process for remote device status audit and recovery, according to one aspect of the present disclosure.

Having described examples of network environment 100 and structures of network components such as routers, access points, switches, etc., we now turn to the description of FIG. 4 illustrating examples that enable a central management component (e.g., controller 104 implemented via cloud networking) to manage and monitor software, configurations, and updates to network components and ensure that each network component has properly executed and implemented configuration files and parameters sent thereto. As further described below, the central management component can determine whether operation of a network device (that is remotely managed by the central management component) corresponding to any one of a number of configuration settings available at the network device has failed. In other words, the central management component compares a state of operation of the network device with reference to a given configuration setting with the "should-be" (dictated, directed, instructed) state of the network device according to the given configuration setting and if there is a mismatch between the two, determines that the operation of the network device with respect to the given configuration setting has failed. Upon detection of such failure, the central management component can implement remedial measures to address this failure and prevent unauthorized access to the underlying network as well as unintended/unexpected network behavior or errors.

FIG. 4 illustrates a process for remote device status audit and recovery, according to one aspect of the present disclosure. FIG. 4 will be described from the perspective of controller 104 described above with reference to FIG. 1.

At S400, controller 104 checks for a triggering event. A triggering event is an event upon which controller 104 requests a status update for any number of configuration settings implemented at any one of router 106, nodes 108 and APs 110 (router 106, nodes 108 and APs 110 may hereinafter collectively be referred to as network devices 106-110) described above with reference to FIG. 1. As described, each configuration setting is a set of computer-readable instructions sent by controller 104 to respective ones of network devices 106-110 depending on the functionality of each of network devices 106-110. These computer-readable instructions can then be implemented and executed locally at the receiving ones of network devices 106-110. In one example, one or more of network devices 106-110 can be a security appliance (e.g., any known or to be developed network security appliance) implemented within network 100 to ensure that network 100 is a secure network.

Examples of configuration settings include, but are not limited to, port settings, radio settings, uplink settings, Virtual Local Area Network (VLAN) tagging settings, firewall rules, wireless broadcasting settings (e.g., authentication settings, encryption settings, etc.).

Referring back to S400, the triggering event controller 104 checks for, can be any one of the following non-limiting events.

The triggering event can be a passage (expiration) of a certain period of time (e.g., every 4 hours, one a day, twice a week, etc.) between two consecutive instances of transmitting a request for status update on a particular configurations setting. In this case, the check at S400 and the following detection of a triggering event may be said to be periodic. The periodicity duration can be a reconfigurable parameter determined based on experiments and empirical studies.

In another example, the triggering event can be when controller 104 provides a set of computer-readable instructions for a particular configuration setting to one or more of network devices 106-110. Alternatively, the triggering event can be shortly (e.g., a few seconds, minutes, hours, etc.) after controller 104 provides the set of computer-readable instructions for the particular configuration setting to the one or more of network devices 106.

In another example, the triggering event can be when any one of network devices 106-110 come online (e.g., activate to be part of network 100) after being offline for a period of time. The offline period of time can be a reconfigurable parameter determined based on experiments and empirical studies (e.g., after being offline for more than a few seconds, minutes, hours, days, weeks, months, years, etc.).

At S405, controller 104 determines if the check at S400 results in a detection of a triggering event. If at S405, controller 104 determines that no triggering event is detected, the process reverts back to S405. Controller 104 repeats S400 and S405 until a triggering event is detected.

If and when controller 104 detects a triggering event at S405, then at S410, controller 104 transmits a request to one or more of network devices 106-110 at which a corresponding triggering event is detected. The request is for a status of operation of the one or more of network devices 106-110 with respect to at least one configuration setting available at the network device. In one example, controller 104 transmits the request via a backend secure and encrypted tunnel/channel created between each of network devices 106-110 and controller 104. In view thereof, the controller 104 can also be referred to as backend component 104.

For example, if at a first point in time, controller 104 transmits a radio configuration settings to one or more APs 110, then at a second point in time (this can be a short time after the transmission of the settings, or regularly thereafter, as described above), controller 104 can make an inquiry into a status of radio operation of the one or more APs 110. For example, controller 104 can communicate with a handler installed on the one or more APs 110 to request information on the nature of what the one or more APs 110 are broadcasting.

Other examples of requests made by controller 104 to one or more network devices 106-110 include what VLAN a switch is trunking to (e.g., when the network device is a switch such as one of nodes 108), what the status of a hardware component at the switch is, what is it that Linux running on the switch is exporting, what is a particular driver on the switch is expecting about a status of a particular function or task, etc.

In examples, where one or more network devices 106-110 are vendor specific devices with vendor specific configurations and settings, controller 104 utilizes a configuration tool to communicate with the vendor specific configuration tool installed on each vendor specific network device in order to transmit the request thereto.

In one example, while a triggering event may be specific to a given configuration setting (e.g., installment of new radio settings on an AP 110 by controller 104), the ensuing request for status update on operations of a network device can be either limited to that corresponding to the radio configuration settings or can encompass a status update on operation the same network device on any number of (or all of) configuration settings hosted by or available on the AP 110. This may be referred to as a partial or full sweep of configuration settings on given network device, depending on whether the request is for a number of or all of the configuration settings hosted by or available on a given network device. In another example, the triggering event can result in controller 104 transmitting the request to all available network devices 106-110 for operations thereof with respect to all or any number of configuration settings available on or hosted by network devices 106-110. This may be referred to as a partial or full sweep of configuration settings on all available network devices, depending on whether the request is for a number of or all of the configuration settings hosted by or available on a given network device.

A S415, controller 104 receives a feedback, through the backend channel described above, from each one of network devices 106-110 to which controller 104 transmits a request at S410. Examples of feedbacks received from network devices 106-110 include responses to examples requests made by controller 104 at S410 described above. For example, in response to a request by controller 104 made to one AP 110 regarding the nature of what it is that the one AP 110 is broadcasting, the feedback received at controller 104 can be, that the one AP 110 is not broadcasting anything (which means that any wireless network/SSID hosted by the one AP 110 that should be available to end devices such as one or more wireless clients 116 is not available). Other example feedbacks, in response to example requests transmitted by controller 104 described above, can include the VLAN(s) to which the corresponding switch is trunking, requested information on status of hardware components at corresponding one(s) of network devices 106-110, etc.

In one example, processes performed at S410 and S415 can be referred to as auditing one or more of network devices 106-110.

At S420, controller 405 determines whether operation of one or more network devices with respect to configuration setting(s) for which request(s) is/are transmitted by controller 104 to corresponding network device(s) at S410 and from which feedback is/are received at S415, matches operations, as commanded (instructed, directed, dictated) by corresponding one of configuration settings (e.g., computer-readable instructions and codes included in the corresponding one of the configuration settings). In the example of controller 104 requesting information on nature of what is it that the one AP 110 is broadcasting, when the corresponding feedback received at S415 is that the one AP 110 is not broadcasting anything, controller 405 determines that the radio operation of the one AP 110 does not match with the operation commanded by radio configuration settings on the one AP 110 and thus determines that the one AP 110 is not functioning correctly (at least with respect to radio configurations thereof). In another example, when the feedback received from a network device from among network devices 106-110 indicates a certain status of a hardware component at the corresponding network device, controller 104 compares the feedback with what controller 104 has as the "should-be" status of the same hardware component (the "should-be" status is the status that the hardware component should be in/have at the time controller 104 requests the status, according to the original configuration setting of the hardware component provided to the corresponding network device by controller 104). If the comparison indicates a mismatch between the reported status and the "should-be" status of the hardware component, then at S420, controller 104 determines that the configuration setting for the hardware component is not being implemented correctly. However, if the reported status and the "should-be" status are the same, then at S420, controller 104 determines that the hardware component configuration setting is being implemented correctly.

At S425, controller 104 determines whether the determination at S420 indicates that the configuration setting(s) is/are implemented correctly (e.g., whether a status of operation of a network device with respect to at least one configuration setting available at the network device matches that commanded by the at least one configuration setting). If at S425, controller 104 determines that the configuration setting(s) is/are implemented correctly, then the process reverts back to S400 and controller 104 repeats S400-S425.

However, if at S425, controller 104 determines that one or more configuration settings is/are not implemented correctly based on the determination at S420, then at S430, controller 104 performs a recovery process for each configuration setting that is not implemented correctly. In other words, controller 104 performs a recovery process so as to adjust (e.g., restart, modify, etc.) implementation of the at last one configuration setting at a network device in order to ensure that the status of operation of the network device, after adjustment, matches that commanded by the at least one configuration setting.

The recovery process for any given configuration setting can be performed at various levels/stages with each stage being verified and if unsuccessful, the next stage being implemented/performed. In other words, the recovery process can be a gradual recovery process. For example, a first stage of a recovery process for correcting the radio configuration settings on the one AP 110 described above (in order to correct the broadcasting of SSID hosted by the one AP 110 and thus enabling wireless clients 116 to access the internet thereby) is for controller 104 to request the one AP 110 to update the radio configuration file that is currently being implement on the one AP 110. Thereafter, at S435, controller 104 can determine if the first stage of the recovery process has been successful. In one example, the determination at S435 can be performed in the same manner as S410, S415 and S420 described above. In other words, controller 104, after performing the first stage of the recovery process, can request an update on the radio configurations setting of the one AP 110, receive a feedback thereon, compare the feedback with the "should-be" radio configuration setting on the AP 110 and determine if the first stage recovery process has been successful.

If at S435, controller 104 determines that the first stage of the recovery process has been successful, the process reverts back to S400 and controller 104 repeats S400 to S435.

However, if at S435, controller 104 determines that the first stage of the recovery process has not been successful, the process reverts back to S430 and controller 104 performs a second stage of the recovery process. In the example of the radio setting of the one AP 110 mentioned above, the second stage can be a limited or a full reconfiguration of the radio setting of the one AP 110 based on the radio setting configuration file available on the one AP 110. This is then followed by the process at S435, as described above.

Should the second stage of the recovery process be inadequate and unsuccessful, S430 is performed again where a third stage of the recovery process is performed. The third stage of the recovery process can be for example, a full reboot of the one AP 110. This is then followed by the process at S435, as described above.

Should the third stage of the recovery process be inadequate and unsuccessful, S430 is performed again where a fourth stage of the recovery process is performed. The fourth stage of the recovery process can be for example, a full wipe and reboot of the one AP 110. In one example, the full wipe and reboot includes clearing all saved states on the AP 110 (e.g., saved authentication information for access the hosted SSID such as usernames, passwords, etc.). This is then followed by the process at S435, as described above.

While several examples of different stages of a corrective process are described above, the present disclosure is not limited thereto. Accordingly, any gradual and multi-stage corrective process for any given configuration setting on a network device such as network devices 106-110 can be implemented at S430 and S435.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A method comprising:
   transmitting, by a controller, a request to a network device of the network for a status of operation of the network device with respect at least one configuration setting available at the network device;
   determining, by the controller, whether the status of operation provided by the network device matches an operation status provided by the at least one configuration setting available at the network device; and
   when the status of operation does not match the operation status available at the network device, performing, by the controller, a recovery process to adjust implementation of the at least one configuration setting available at the network device.

2. The method of claim 1, further comprising:
   detecting a triggering event,
   wherein
   the determining is performed when the triggering event is detected.

3. The method of claim 2,
   wherein,
   the triggering event includes at least one of:
      receiving an update request from the network device for an update to a configuration setting implemented at the network device;
      activation of the network device within the network; or
      expiration of a period of time between two consecutive transmittings.

4. The method of claim 1,
   wherein,
   the recovery process is a gradual recovery process, and a next stage of the gradual recovery process is performed only when a preceding stage of the gradual recovery process fails to correctly implement the at least one configuration setting.

5. The method of claim 1, further comprising:
   receiving a feedback from the network device corresponding to the request; and
   performing the determining based on the feedback.

6. The method of claim 1,
   wherein,
   the request is a full sweep request for the status of operation of the network device with respect to each of a plurality of configuration settings available at the network device; and
   the determining determines a corresponding status of operation of the network device with respect to each of the plurality of configuration settings based on a corresponding feedback received from the network device.

7. The method of claim 1,
   wherein,
   the at least one configuration setting includes at least one of:
      a service set identifier setting of at least one wireless network hosted by the network device;
      a virtual local area network tagging setting of the at least one wireless network;
      an uplink setting at the network device;
      a port configuration of the network device;
      a radio setting of the network device;
      firewall rules of the network device; and
      at least one wireless broadcasting configuration by the at least one wireless network.

8. The method of claim 1,
   wherein,
   the recovery process includes at least one of:
      updating a configuration file on the network device corresponding to the at least one configuration setting at the network device;
      performing a reconfiguration of the at least one configuration setting;
      performing a reboot of the network device; and
      performing a wipe and reboot of the network device.

9. A system comprising:
   one or more processors; and
   at least one computer-readable storage medium having instructions stored therein which, when executed by the one or more processors, cause the system to:
      transmit a request to a network device of the network for a status of operation of the network device with respect at least one configuration setting available at the network device;
      determine whether the status of operation provided by the network device matches an operation status provided by the at least one configuration setting available at the network device; and
      when the status of operation provided by the network device does not match the operation status, performing a recovery process to adjust implementation of the at least one configuration setting available at the network device.

10. The system of claim 9,
    wherein,
    the at least one computer-readable storage medium has additional instructions which, when executed by the one or more processors, cause the system to determine whether to detecting a triggering event, and transmitting the request is performed when triggering event is detected.

11. The system of claim 10,
wherein,
the triggering event includes at least one of
receiving an update request from the network device for an update to a configuration setting implemented at the network device;
activation of the network device within the network; or
expiration of a period of time between two consecutive transmittings.

12. The system of claim 9,
wherein,
the recovery process is a gradual recovery process, and
the instructions further cause the system to perform a next stage of the gradual recovery process only when a preceding stage of the gradual recovery process fails to correctly implement the at least one configuration setting.

13. The system of claim 9,
wherein,
the instructions further cause the system to receive a feedback from the network device corresponding to the request, and
determining whether the status of operation provided by the network device matches the operation status provided by the at least one configuration setting available at the network device is performed based on the feedback.

14. The system of claim 9,
wherein,
the at least one configuration setting available at the network device is a plurality of configuration settings available at the network device,
the request is a full sweep request for the status of operation of the network device with respect to each of the plurality of configuration settings available at the network device; and
the instructions further cause the system to determine a corresponding status of operation of the network device with respect to each of the plurality of configuration settings based on a corresponding feedback received from the network device.

15. The system of claim 9,
wherein,
the at least one configuration setting includes at least one of:
a service set identifier setting of at least one wireless network hosted by the network device,
a virtual local area network tagging setting of the at least one wireless network,
an uplink setting at the network device,
a port configuration of the network device,
a radio setting of the network device,
firewall rules of the network device, and
at least one wireless broadcasting configuration by the at least one wireless network; and
the recovery process includes at least one of:
updating a configuration file on the network device corresponding to the at least one configuration setting at the network device,
performing a reconfiguration of the at least one configuration setting,
performing a reboot of the network device, and
performing a wipe and reboot of the network device.

16. The system of claim 9,
wherein,
the system is a cloud based controller that is configured to remotely access and manage the network device;
the network device is at least one of an access point, a switch, a router or a network security appliance; and
the cloud based controller is configured to remotely access and manage the network device via a secure encrypted backend tunnel.

17. A non-transitory computer-readable storage medium having stored therein instructions which, when executed by one or more processors associated with a network controller, cause the network controller to:
transmit a request to a network device of the network for a status of operation of the network device with respect at least one configuration setting available at the network device;
determine whether the status of operation provided by the network device matches an operation status provided by the at least one configuration setting available at the network device; and
when the status of operation provided by the network device does not match the operation status, perform a recovery process to adjust implementation of the at least one configuration setting available at the network device.

18. The non-transitory computer-readable storage medium of claim 17, wherein the instructions further cause the controller to transmit the request based on a detection of a triggering event.

19. The non-transitory computer-readable storage medium of claim 17,
wherein,
the recovery process is a gradual recovery process, and
the instructions further cause the network controller to perform a next stage of the gradual recovery process only when a preceding stage of the gradual recovery process fails to correctly implement the at least one configuration setting.

20. The non-transitory computer-readable storage medium of claim 17,
wherein,
the network device is remotely accessed and managed by a cloud based controller;
the network device is at least one of an access point, a switch, a router or a network security appliance;
the cloud based controller is configured to remotely access and manage the network device via a secure encrypted backend tunnel; and
the recovery process results in a correct implementation of the at least one configuration setting by the network device.

* * * * *